(12) United States Patent
Probasco

(10) Patent No.: US 12,144,078 B2
(45) Date of Patent: Nov. 12, 2024

(54) LIGHTING CONTROL SYSTEMS AND METHODS

(71) Applicant: ASTRO SPACE, LLC, Plainsboro, NJ (US)

(72) Inventor: William F. Probasco, Plainsboro, NJ (US)

(73) Assignee: ASTRO SPACE, LLC, Plainsboro, NJ (US)

( * ) Notice: Subject to any disclaimer, the term of this patent is extended or adjusted under 35 U.S.C. 154(b) by 0 days.

(21) Appl. No.: 18/456,480

(22) Filed: Aug. 26, 2023

(65) Prior Publication Data

US 2024/0074014 A1 Feb. 29, 2024

Related U.S. Application Data

(60) Provisional application No. 63/401,228, filed on Aug. 26, 2022.

(51) Int. Cl.
| | |
|---|---|
| *H05B 47/10* | (2020.01) |
| *G06F 3/0484* | (2022.01) |
| *H05B 45/00* | (2022.01) |
| *H05B 45/325* | (2020.01) |
| *H05B 45/3725* | (2020.01) |
| *H05B 47/16* | (2020.01) |
| *H05B 47/175* | (2020.01) |

(52) U.S. Cl.
CPC ......... *H05B 45/325* (2020.01); *G06F 3/0484* (2013.01); *H05B 45/3725* (2020.01); *H05B 47/16* (2020.01); *H05B 47/175* (2020.01)

(58) Field of Classification Search
CPC ...... H05B 45/10; H05B 45/30; H05B 45/325; H05B 45/3725; H05B 47/10; H05B 47/16; H05B 47/175; G06F 3/0484
See application file for complete search history.

(56) References Cited

U.S. PATENT DOCUMENTS

2021/0112647 A1* 4/2021 Coleman ................ H05B 45/12

FOREIGN PATENT DOCUMENTS

CA 2805851 C * 3/2017 ............. H05B 33/08

* cited by examiner

Primary Examiner — Jimmy T Vu
(74) Attorney, Agent, or Firm — Thomas | Horstemeyer, LLP

(57) ABSTRACT

The present disclosure presents lighting control systems and related methods. One such system comprises a light emitting device comprising a plurality of channels, each channel of the plurality of channels including one or more light emitting diodes configured to emit light at a respective predominant wavelength, and a plurality of direct current drivers, each direct current driver of the plurality of direct current drivers supplying power to a respective channel of the plurality of channels. The system further includes a router module that is configured to communicate with the light emitting device; and a graphical user interface configured to specify and control a plurality of parameters of each channel of the plurality of channels, wherein the plurality of parameters enable adjustment of a spectral content, intensity, and schedule of illumination, in addition to enabling a DC mode of operation or a pulse width modulation (PWM) mode of operation.

20 Claims, 20 Drawing Sheets

LIGHTING CONTROL SYSTEMS AND METHODS

CROSS-REFERENCE TO RELATED APPLICATION

This application claims priority to U.S. provisional application entitled, "Lighting Control Systems and Methods," having Ser. No. 63/401,228, filed Aug. 26, 2022, which is entirely incorporated herein by reference.

BACKGROUND

One of the widest known requirements for plant growth and maturity is appropriate lighting, most often provided by the sun. The spectrum of light that plants use in their metabolism is referred to as Photosynthetically Active Radiation (PAR) and is defined as that light spectrum between 400 nm and 700 nm. It is a spectrum or bandwidth of light that most plants utilize throughout their growth cycle. In more recent years, it has been recognized that an extended definition of PAR, referred to as Extended Photosynthetically Active Radiation (ePAR), extends PAR, to include the wavelengths from 400 nm to 750 nm. However, there are situations where sufficient intensity of PAR is not practical or even available. One perfect example of this is vertical farming. Others include greenhouse supplemental lighting, urban indoor gardens, many hydroponic systems and plant growth research facilities.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 also shows a direction of light emitted from a plurality (PC board) of LEDs (not shown). This is an example of a horizontally mounted, vertical emitting, LED light fixture.

FIGS. 16-18 show various light groups scheduling panels of the GUI software interface of the LED lighting fixture in accordance with various embodiments of the present disclosure, namely FIG. 16 shows a raw "SCHEDULES" panel, FIG. 17 shows a "SCHEDULES" panel with PRESETs filled in for a "SINGLE" schedule, and FIG. 18 shows a "SCHEDULES" panel with PRESETs filled in for a "RECURRING" schedule, all of which are embodiments of the present disclosure.

DETAILED DESCRIPTION

Various crops, light environments and economic constraints often dictate very unique light spectral content and intensity needs. The task of providing the required light is even more complex due to the fact that many plants require a significantly different spectrum of light to mature or bloom than that which is optimum for basic metabolic growth. High-pressure sodium, Metal Hydride, fluorescent and incandescent lights simply cannot provide this required shift in spectral content. Only light emitting diode (LED) lights have the ability to provide this shift, but it takes more than just the LEDs. The ability to adjust the spectral content, intensity and schedule(s) of illumination, as well as provide DC or Pulse Width Modulation (PWM) modes of operation, requires not only a sophisticated LED light, but the intervention of user programmable controls.

In various embodiments, the LED light systems and methods of the present disclosure are applied in context outside of plant growth applications, such as commercial/industrial and research applications that may involve experimental and novel lighting implementations requiring unconventional and complex user-defined configurations of lighting parameters. For example, by adjusting the Maximum Current level for all channels to just above the current threshold of the light emitting diodes of the channel or channels of interest and also reducing the applied duty cycle of the PWM driver or drivers output(s) to the channel(s) of LEDs, extremely low intensity light levels can be achieved supporting low light experiments. Further, since each wavelength (channel) of LEDs may have different thresholds of voltages and/or currents, the ability to customize the current level (duty factor) of each individual channel of LEDs in addition to setting their Maximum Current (global setting), allows the user to obtain the desired spectrum, as well as extremely low intensity setting for each channel, simultaneously. Such user-customization is not available with conventional lighting systems and control interfaces.

Figure 1:
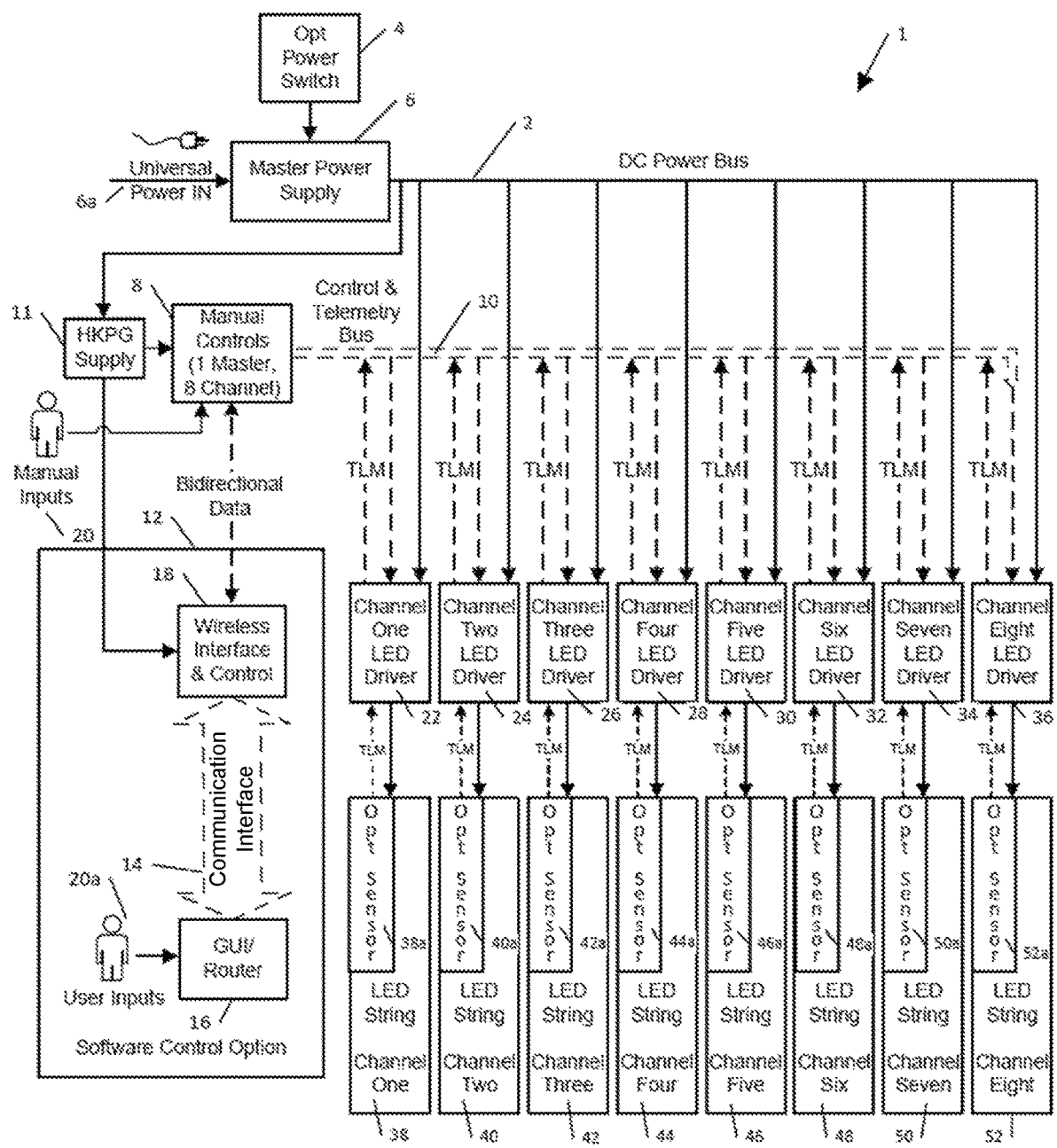
FIG. 1 shows a block diagram of a method, apparatus, and system in accordance with one or more embodiments of the present disclosure.

FIG. 1 shows a block diagram of a method, apparatus, and/or system 1 in accordance with one or more embodiments of the present disclosure. The method, apparatus, and/or system 1 may include a master power supply 6, a power switch 4, a DC (direct current) power bus 2, a control device (one master, eight channels, one adjustable reference) 8, a control & telemetry bus 10, a Housekeeping (HKPG) supply 11, a digital control interface 12, a communications interface or module 14, a direct network connection 16, a wireless connection 18, a port or other means for user input 20 or 20a, a first channel LED (light emitting diode) driver 22, a second channel LED driver 24, a third channel LED driver 26, a fourth channel LED driver 28, a fifth channel LED driver 30, a sixth channel LED driver 32, a seventh channel LED driver 34, an eighth channel LED driver 36, an LED string first channel 38, an LED string second channel 40, an LED string third channel 42, an LED string fourth channel 44, an LED string fifth channel 46, an LED string sixth channel 48, an LED string seventh channel 50, and an LED string eighth channel 52.

The control device 8 may be a device which includes manual controls and or a hardware computer processor and memory. The computer memory of the control device 8 may be loaded with data concerning light intensity requirements for vegetation, and/or a plurality of plants. The light intensity requirements or criteria of the vegetation to be illuminated, may specify the light intensity to be provided by each LED of the plurality of sets of LED string channels 38, 40, 42, 44, 46, 48, 50, and 52 (also referred to as a light recipe). The light intensity of the sets 38, 40, 42, 44, 46, 48, 50, and 52 may be gradually varied independently or in concert, during any desired period, from an intensity low at one set of PWLs of light (i.e., to mimic night time, prior to sunrise) to a peak intensity at perhaps another set of PWLs of light (i.e., to mimic noon time or whenever the sun shines brightest in the sky), and back to the intensity low at a previous or yet another set of PWLs of light (after the "sun" goes down) as determined by a computer program stored in computer memory of the control device 12. The computer memory of the control device 8 may be programmed to mimic light intensity depending on different seasons of the year and or specific needs of the vegetation it is illuminating. For example, the peak intensity of light in the winter may be different than that in the summer. The computer memory of the control device 8 may be programmed with differing peak intensities and differing low intensities for light emission, depending on time of year.

The computer memory of the control device 8 may also be programmed to provide different peak intensities, differing low intensities of light, and differing rates of change of intensity of light over the eight channels of PWL light, depending on where a plant is in its growth cycle. For example, if a plant is young, the intensity of the higher frequency (blue end of visible spectrum) PWLs of light may be greater than that of a maturing or fruit-ripening plant.

The computer memory of the control device 8 may also be programmed to provide different peak intensities, differing low intensities of light, and differing rates of change of intensity of light over the eight channels of PWL light, depending on the type of plant.

The master power supply 6 may include a universal input 6a, shown in FIG. 1. The master power supply 6 may be a voltage regulated DC (direct current) power supply with power factor correction. The master power supply 6 may supply power to each of the eight typically independent LED channels drivers 22, 24, 26, 28, 30, 32, 34, and 36, which in turn provide drive power to their respective LED string through eight channels 38, 40, 42, 44, 46, 48, 50, and 52. In various embodiments, the power supply may be located remotely from the location of the light fixtures and any plants to limit heat flow to the surrounding area.

LEDs exhibit varying degrees of wavelength shift due to excitation current, typically as much as 5%, or slightly more for some LEDs. The predominant wavelength (PWL) of LEDs also varies with die temperature. In cases where this small shift in wavelength is intolerable, it can be greatly reduced or eliminated by applying a fixed current level that is chopped or pulse width modulated (PWM) to the LEDs. Each of the LED drivers 22, 24, 26, 28, 30, 32, 34, and 36, in this lighting system, apparatus and/or method 1, can power a string of series connected LEDs in one or more embodiments, by a constant direct current (DC) driver for drivers 22, 24, 26, 28, 30, 32, 34, and 36 or, where situations require the most limited shift in frequency over intensity, current drivers can be configured as pulse width modulated drivers for drivers 22, 24, 26, 28, 30, 32, 34, and 36.

Figure 2:
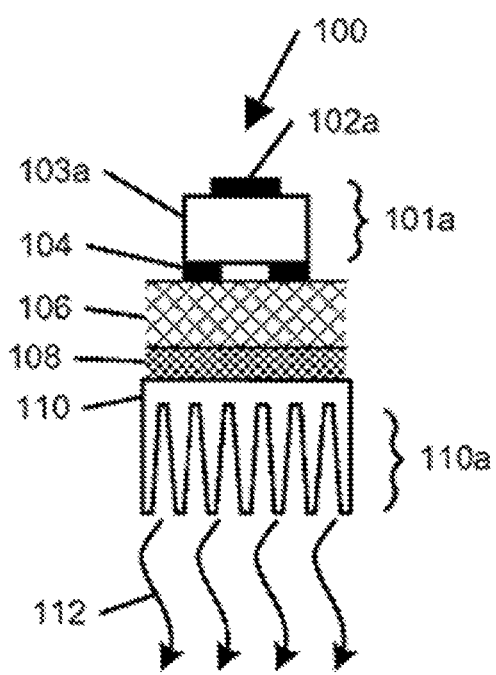
FIG. 2 shows a cross-section diagram of a light emitting diode (LED) device showing an LED attached to a printed circuit (PC) board, which is attached to a thermal interface, which is attached to a heat sink in accordance with one or more embodiments of the present disclosure.
Figure 3A:
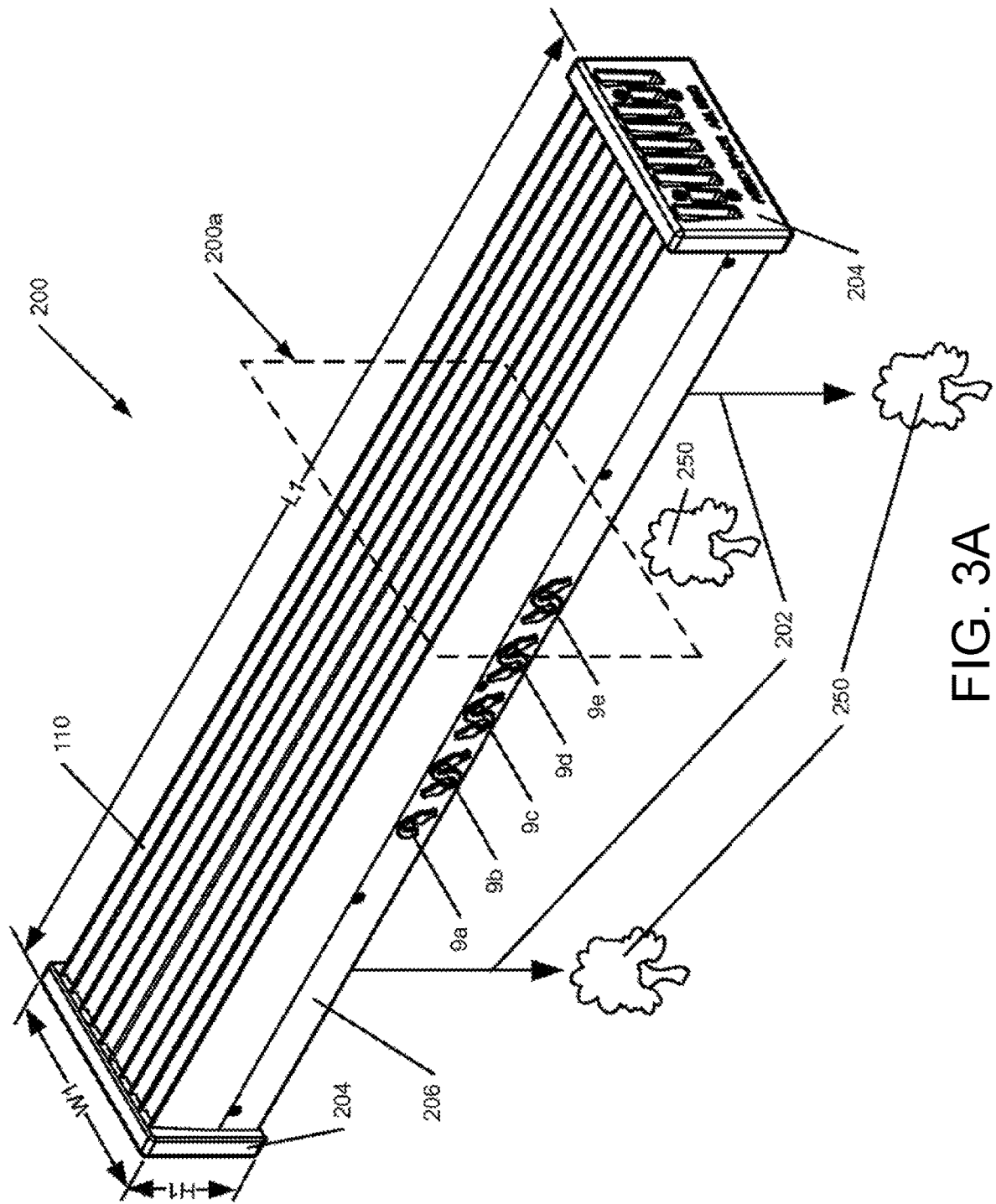
FIG. 3A shows a top, front, and right perspective view of one LED light model in accordance with an embodiment of the present disclosure.

FIG. 2 shows a cross-sectional view of an LED device and its mounting system 100, including an LED 101a, having an LED die 102a, a substrate with terminals (package or case) 103a, which is attached by a solder joint 104, to a printed circuit board 106, which is attached to a thermal interface 108, which is attached to a heat sink 110, which emits heat to the air 112, in accordance with one or more embodiments of the present disclosure. In at least one embodiment, the heat sink 110 is typically larger than the printed circuit board 106. In addition, the heat sink 110 is typically larger than the "field" of the plurality of LEDs 101, which all are mounted on one or more PC board(s) 106. In at least one embodiment, the heat sink 110 may be made of black anodized aluminum with fins, such as including fin 110a, through which to dissipate heat, passively. A fan could be used in one or more embodiments, however a fan introduces reliability issues. A fan may reduce the size of heat sink and/or fins. In at least one embodiment, the fins, such as fins 110a, may have, but is not limited to, a width of about 4.625 inches, W1, and extend about 23.5 inches in length, L1, and may have, but is not limited to, a height, H1, which is less than the width, W1, as shown in FIG. 3A. However other dimensions are possible in various implementations. In at least one embodiment, it is critical that the heat sink 110 is larger in length, or width, or both than the PC board 106, which is larger than the "field" or region on which the plurality of LEDs 101 are mounted on the PC board 106.

Looking at FIG. 2 from a thermal perspective, a stack-up of thermal resistances occurs as a result of the LED device mounting system, device or apparatus 100, through its intimate attachment to the heat sink 110, and is described as follows: At the top of the diagram 100, the die 102a operates at a higher temperature than ambient. There is a series of thermal gradients (temperature changes from high to low) as heat flows though the mounting system, device, or apparatus 100; first through the thermal resistance of die 102a through the case 103a ($\Theta_{dc}$), then through the thermal resistance of case 103a to board 106 ($\Theta_{cb}$), then through the thermal resistance of the PC board 106 itself ($\Theta_b$), then through the thermal resistance of board 106 to heat sink interface 108 ($\Theta_{bhi}$), then through the thermal resistance of the heat sink 110 itself ($\Theta_{hs}$), and finally through the thermal resistance of the heat sink 110 to air 112 ($\Theta_{ha}$), where heat is radiated into the ambient air. The intimate arrangement of a plurality of LEDs 101, shown in FIGS. 3B and 4, such as that which includes LED 101a of FIG. 2, through to the heat sink 110 provides a minimal thermal gradient from LED die 102a to the surrounding air, at a minimum of cost, due to passive cooling. In extreme environments where high light intensity and ambient temperatures are encountered, active cooling may be provided through the use of a blower or fan as part of the light fixture. In such case, a cover over the heat sink, enclosing its fins, may be incorporated to facilitate proper airflow.

Each LED of each set of series connected string of LEDs, or channels 38, 40, 42, 44, 46, 48, 50, and 52, may be similar to or the same as the LED 101a and may have the same or similar components as LED device 101a of FIG. 2. As mentioned above, each channel driver of channel drivers 22, 24, 26, 28, 30, 32, 34, and 36 can be optionally configured as a direct current (DC) or pulse with modulated (PWM) LED current driver. "White" LEDs can be incorporated in any of the strings 38, 40, 42, 44, 46, 48, 50, and 52 to provide full spectrum illumination under which operators may perform work, inspect plants or apparatus or safely navigate in what might be an otherwise poorly lighted area.

Since the efficiency of each LED, such as LED 101a, and each further LED of each set of LED strings 38, 40, 42, 44, 46, 48, 50, and 52 (or plurality of LEDs, 101, shown in FIGS. 3B and 4) is dependent, in part, on die temperature, such as die 102a, it is critical, in at least one embodiment, to keep this temperature rise above ambient temperature to a minimum. The apparatus, method, and/or system 1 of FIG. 1, in at least one embodiment, provides a minimum of thermal resistance between the component die, such as die 102a, of each LED device of the plurality of LED devices 101, such as LED device 101a, and ambient air as the heat is removed from the LED die 102a through its part's package 103a, then through the solder joints 104, then through a printed circuit board 106, through the thermal interface 108, through the heat sink 110, and finally to the surrounding air 212, as shown by FIG. 2. This minimal thermal path is facilitated by attaching each printed board, such as printed circuit board 106, upon which all LEDs of the plurality of LEDs 101, such as LED device 101a, are soldered to a PC board 106, which is attached to a heat sink 110, through a thermally conductive, electrically insulating, thermally conductive interface 108. The printed circuit board 106, may be constructed of 2 or more conductive layers connected by multiple and strategically placed thermal vias throughout to promote heat flow and reduce the thermal gradient it would otherwise impose on the system. The thermal interface 108 may be made of a mechanically compliant, thermally conductive, electrical insulator. The heat sink 110 may be massive in at least one embodiment and may run the full length and width of the one or all printed circuit board(s), shown as printed circuit board 106, supporting all of the LED devices 101, similar to or identical to device 101a in LED strings 38, 40, 42, 44, 46, 48, 50, and 52. This configuration promotes dissipation of the heat to the ambient air 112 with a minimal total thermal gradient from LED die 102a to the surrounding air 112.

The direct efficiency of the lighting system, method, and/or apparatus 1, is enhanced not only by the efficiency in which the LEDs of each of the strings 38, 40, 42, 44, 46, 48, 50, and 52 convert electrical energy into photon energy, but also by the high-efficiency converters used within the drivers 22, 24, 26, 28, 30, 32, 34, and 36 for the eight channels, the master power supply 6, and the housekeeping supplies 11, which are shown in FIG. 1. Moreover, this particular lighting system offers a considerable advantage over all other non-LED lighting systems, as well as some of the LED fixtures currently available, in one or more embodiments. This is due in large part to the fact that power is not wasted producing light in frequency ranges not abundantly used in photosynthesis. A blatant example is the fact that when you look at a plant you generally see green. That's because the green wavelength is not absorbed as much as the other colors and is reflected back to the observer and, in part to the fact that the human eye's response to green light is particularly high, in comparison to other wavelengths. Typically, photosynthesis in plants is only minimally active in the regions of green, yellow, and orange color frequencies. This system of lighting not only allows one to limit those wavelengths of light that are minimally or non-photosynthetically active, but also to customize or select those wavelengths of light that are specifically appropriate for various plants. In providing this customization, this system offers the possibility of considerable efficiency improvements over those currently available.

Other less apparent, but nonetheless significant, gains in overall benefit in greenhouses and especially growth chambers comes as a result of not having to remove heat that would be otherwise generated in the chamber by the master power supply 11 of FIG. 1 or by other lighting systems that introduce unwanted heat into the surrounding plant environment. Another important feature of the LED lighting method, apparatus, and/or system 1 of FIG. 1, in at least one embodiment, is that each light fixture may be powered by a universal input, power factor corrected, voltage regulating, master power supply 6 that can be remotely located, removing its contribution of heat from growth chambers or other confined areas where the light is mounted. Mounting the master power supply 6 outside of the growing chambers/areas reduces the amount of heat transferred into these environments by an additional 10% or more.

Further gains of efficiency can be achieved using this lighting system, since not only does it not waste power by producing light in frequencies where there is little or no photosynthetic activity it also allows for the customization of wavelength channels, as described above. One can adjust the output (intensity) of each frequency to be optimum for any given plant. This includes the ability to reduce the output of the light so as not to over expose plants to a light intensity that may be counterproductive.

Figure 5:
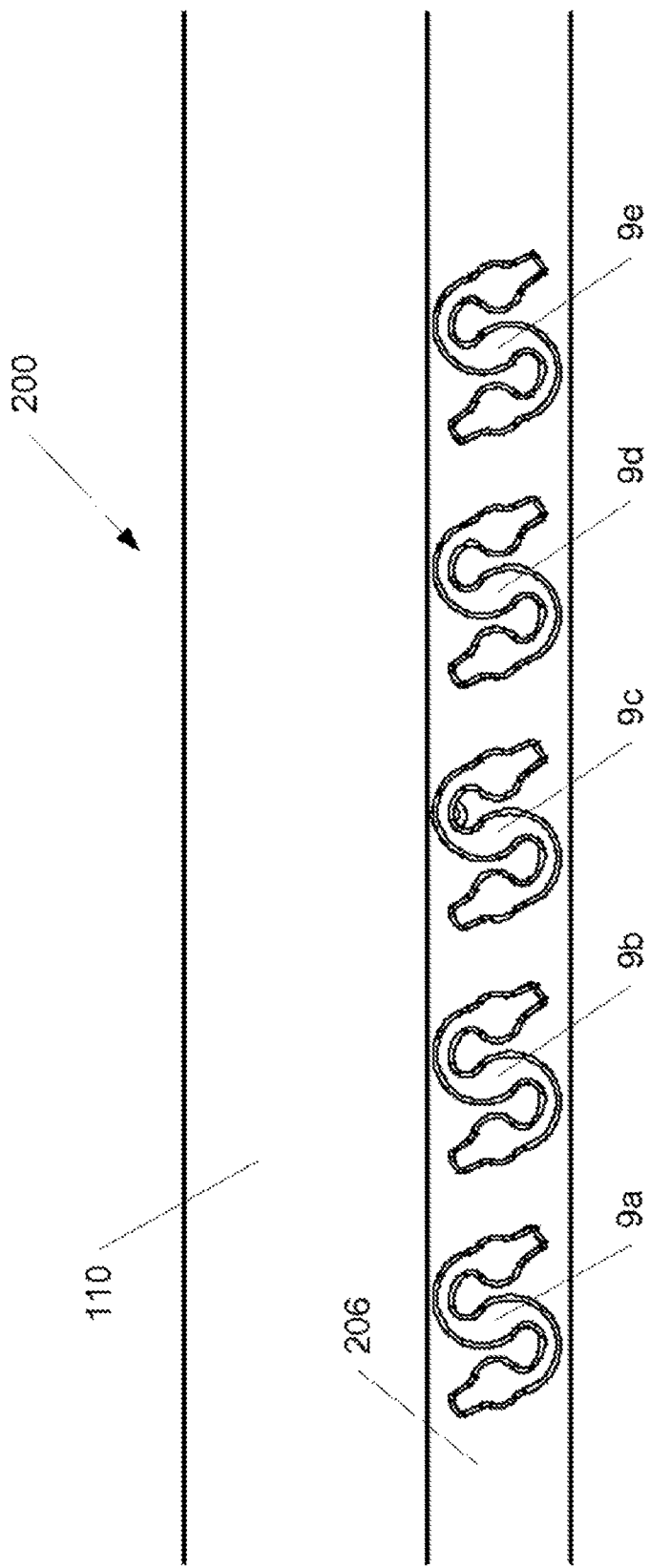
FIG. 5 shows a diagram of the adjustment port plugs (closed) for manual control.
Figure 6:
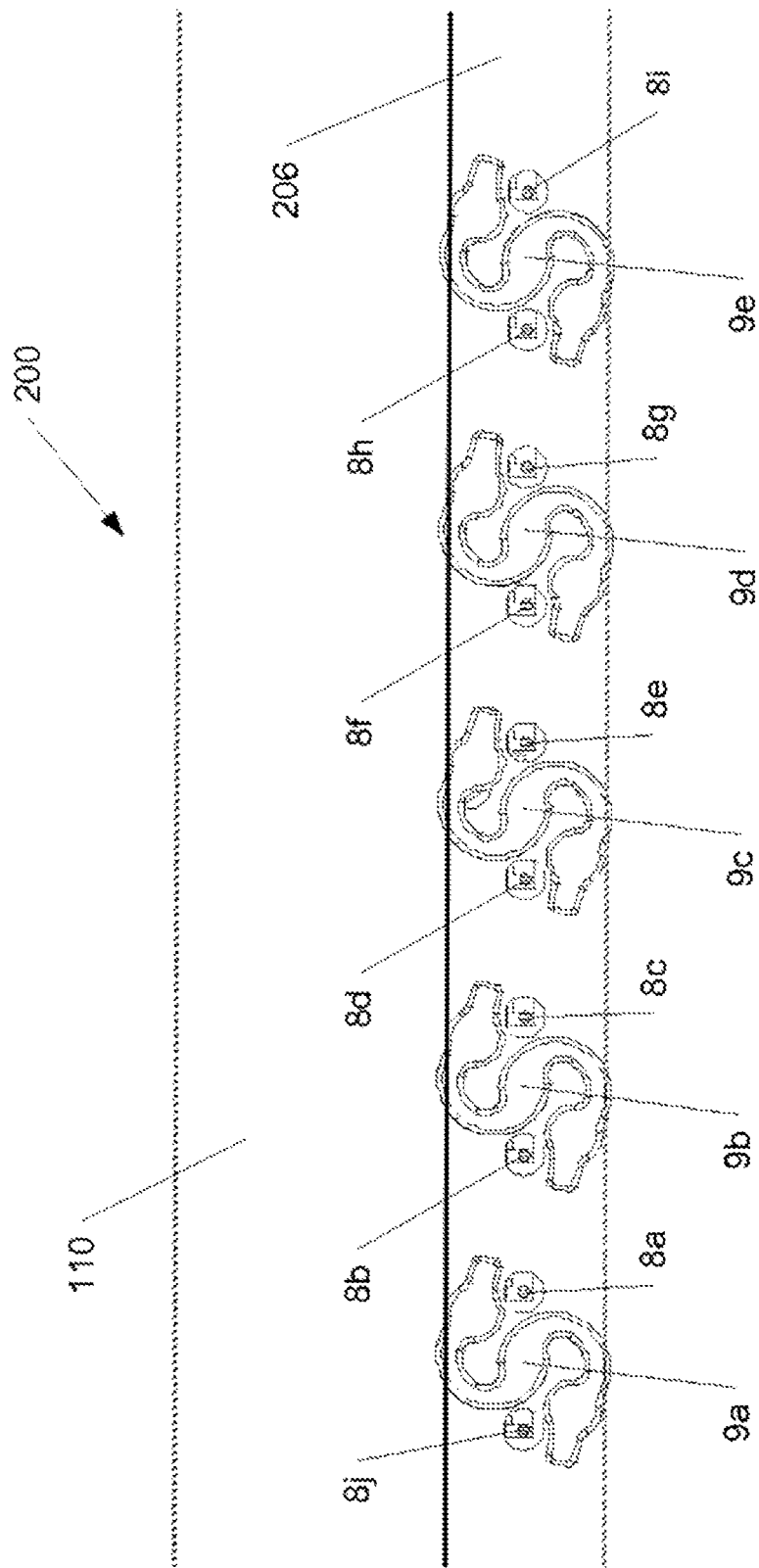
FIG. 6 shows a diagram of the adjustment ports with plugs open for manual adjustment of the control.

As mentioned above, this lighting system, apparatus, and/or method of one or more embodiments of the present application has two base options: a) the manual model and b) the automated (i.e., computer controlled) model. In the manually controlled model, in certain embodiments, each channel, of channels 38, 40, 42, 44, 46, 48, 50, and 52, may have its own intensity control 8b-8h, in FIG. 6, respectively, that can be used to adjust the intensity of its LEDs from zero (fully counter-clockwise, CCW) to maximum (fully clockwise, CW). Correspondingly, in certain embodiments, a single manual master intensity adjustment control may be used to adjust the intensity of all channels. Thus, a master intensity control 8a in FIG. 6 for manual models) can be provided as a convenient means of adjusting all of the channels' intensities (for all of channels 38, 40, 42, 44, 46, 48, 50, and 52), simultaneously. The master intensity control modulates all of the individual channel controls through specially designed multiplier circuits on the control input of each of the channel drivers 22, 24, 26, 28, 30, 32, 34, and 36. This is what provides the ability of common intensity adjustment of all channels with the master control slider control, while allowing for independent adjustment of each channel by their respective channel controls. Each of these adjustment potentiometers, master, and channels 38, 40, 42, 44, 46, 48, 50, and 52, may be accessed through adjustment hole plugs 9a, 9b, 9c, 9d and 9e that can be unplugged and rotated to allow access to the adjusting potentiometers through ports in the side panel 206 shown closed in FIG. 5 and open in FIG. 6. In certain embodiments, insertion of a wireless interconnect into the slot disables manual control.

In certain embodiments, adjustment of this lighting system would be made as follows: Starting with channel adjustment potentiometers 8a-8i for corresponding LED strings 38, 40, 42, 44, 46, 48, 50, and 52, as well as the master intensity control potentiometer 8a of LED lighting fixture 200, in FIGS. 3A and 3B, at maximum (fully clockwise), set each of the eight channel adjustment potentiometers 8b-8i of control device 8 in FIG. 6, to achieve the desired spectral profile. Then, reduce the master control potentiometer 8a of control device 8 until the desired level of overall light intensity is obtained, which in many cases, may remain at maximum. Turning the adjustment screws of the adjustment potentiometers clockwise, increases the intensity (current level) of their respective LED string. Conversely, counter-clockwise rotation reduces intensity (current level). Dust, debris, and moisture protection of the adjustment pots and other associated components of the control device is provided by specially designed self-retaining potentiometer adjustment access hole plugs 9a-9e, in FIG. 5.

An optional adjustment 8j may be provided to adjust the overall reference voltage to the control circuits. This may be useful in situations where extremely low light intensities as well as fine granularity of adjustment are required and is necessary only when operating the drivers in PWM mode. This port 8j would be located next to the master adjustment port 8a behind port plug 9a, in certain embodiments.

Figure 3B:
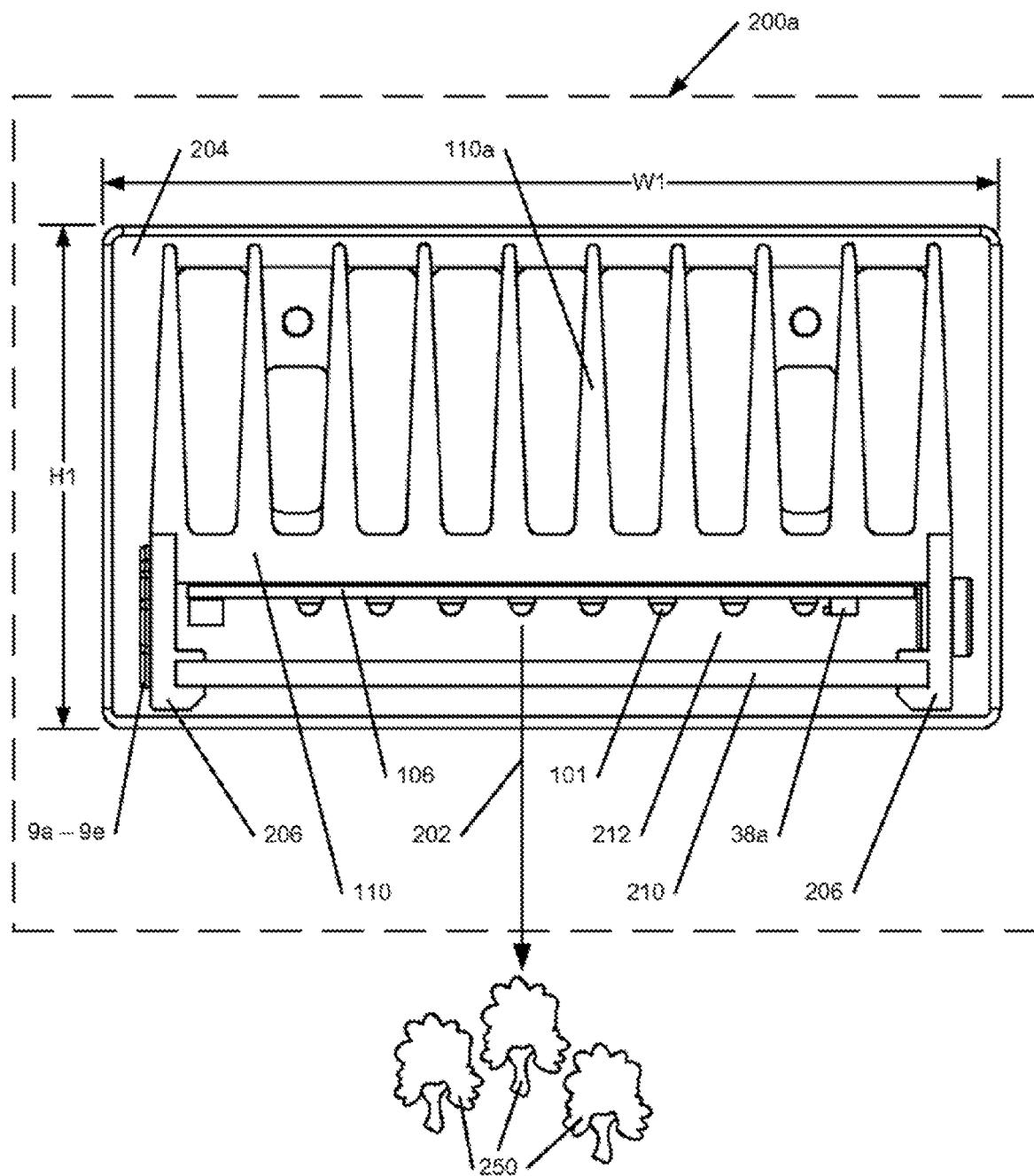
FIG. 3B shows a cross-sectional view of light model shown in FIG. 3A in accordance with an embodiment of the present disclosure.
Figure 4:
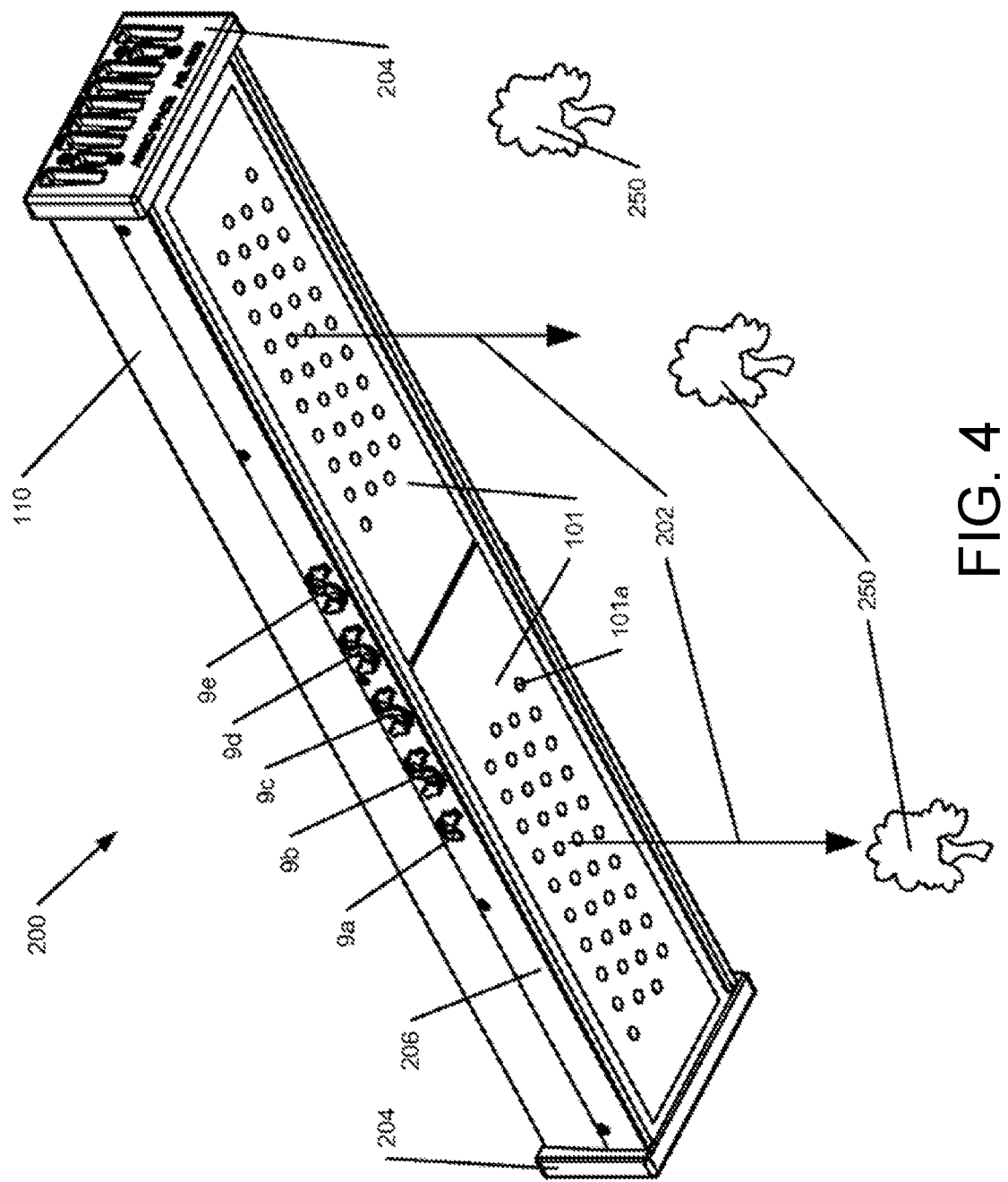
FIG. 4 shows a bottom, front, and right perspective view of the LED light model of FIG. 3A.

In FIG. 4, the direction of light 202 of FIG. 3A, emitted from a plurality of LEDs 101, including LED 101a, directed at vegetation 250 is shown. FIGS. 3A, 3B, and 4 also show the direction of the light 202 emitted from the plurality of LEDs 101 to vegetation 250. However, the LEDs 101 are not visible in FIG. 3A.

FIG. 3B is a cross-sectional view 200a of the area 200a indicated in FIG. 3A. It shows a sealed compartment 212 created by the heat sink 110, side panels 206, end caps 204, adjustment plugs 9a-9e, and transparent panel 210. Not fully apparent in FIG. 3B is the clear opening below the transparent panel 212 through which light 202 may pass unimpeded (downward in the diagram). This is due to the lower outline of the far-end end cap 204 being shown in the cross-sectional view.

Figure 10:
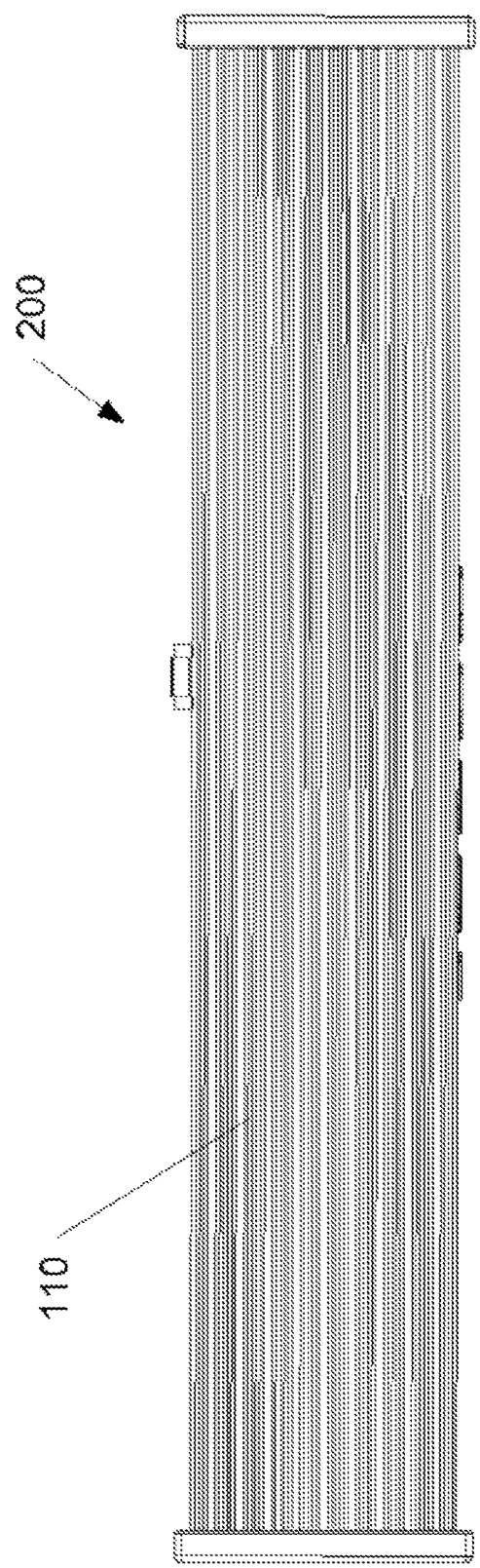
FIG. 10 shows a top view of a typical twenty-four inch LED light fixture (viewed from heat sink fins).
Figure 11:
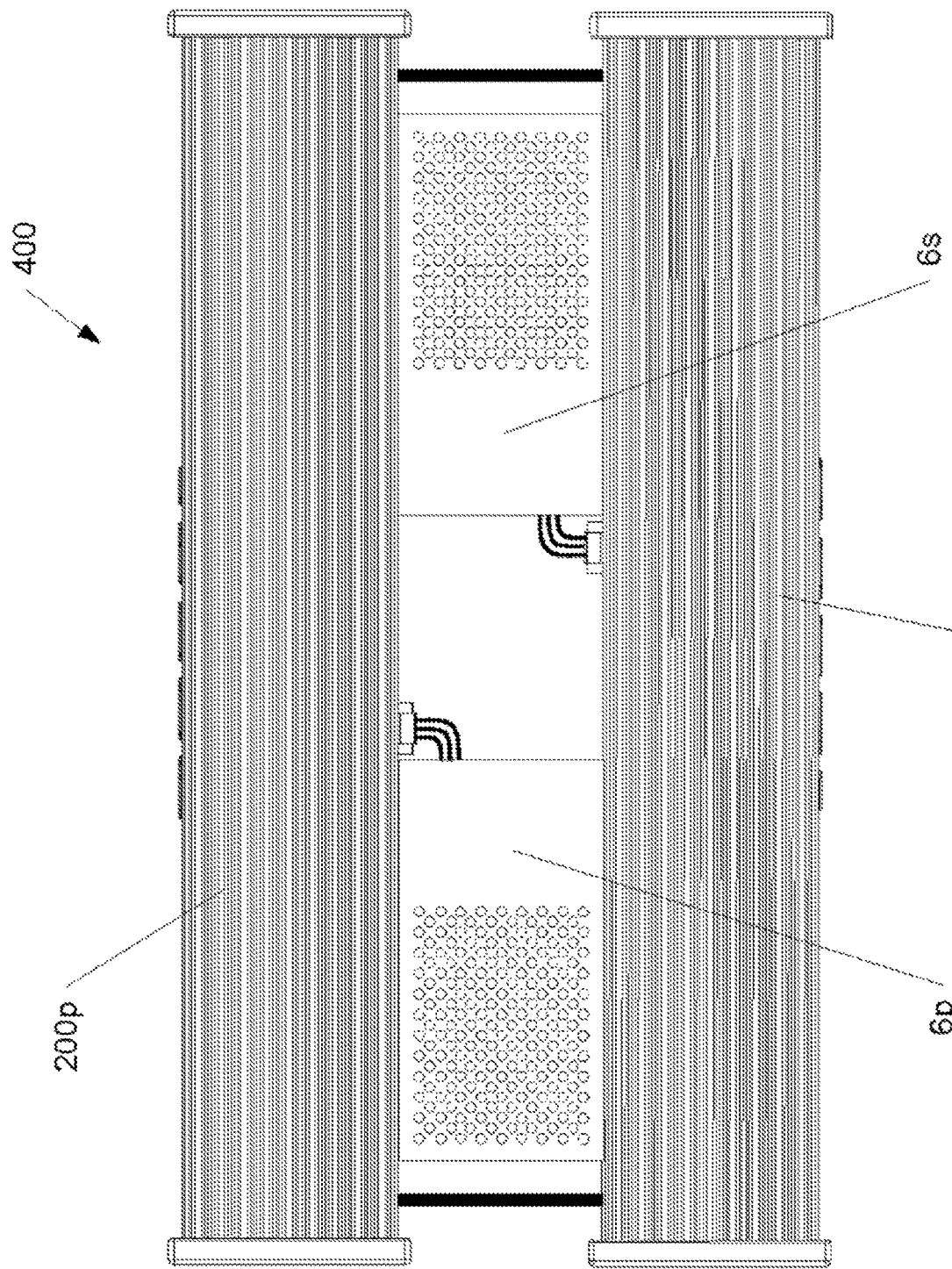
FIG. 11 shows an LED lighting fixture comprised of two heat sink assemblies, and two master power supplies, in accordance with another embodiment of the present disclosure.

The lighting system, apparatus, and/or method 1 of FIG. 1 is modular in so much as it can be implemented, for a non-limiting example, as a four inch by twelve inch fixture, using only one printed circuit board, a six inch by twenty-four inch fixture using two printed circuit boards installed on one heat sink, as shown in element 200 of FIG. 10, or as a dual twenty four inch fixture 400 of FIG. 11, using four PC boards in two units 200p, 200s, the latter of which may have the master power supplies 6p and 6s of fixture 400 in FIG. 11, mounted between the two heat sinks. This configuration would be intended for greenhouses, growth chambers or other large area lighting applications. In every case mentioned, size stated in inches implies an approximate, nominal size. Actual dimensions may vary from nominal.

Optionally, this or any manifestation (one, two, or four printed board system) of this lighting fixture may be equipped with a digital control interface 12 shown in FIG. 1. The digital control interface 12 replaces manually adjustable potentiometers 8a-8h shown in FIG. 6, with a graphic user interface (GUI) resembling that of an audio equalizer. In the digital control interface 12 in FIG. 1, there would be individual intensity adjustments for each channel, as well as, a master intensity control and optional reference control. The master control slider in the GUI would modulate the output intensity of all channels, in concert, and the reference control would modulate the reference voltage which serves as an input to all other controls, as in the manual model. This would make it easy for the user to adjust the spectral profile of any given light fixture, of any size array, to that desired, with the benefit of a graphical representation. Not only would one be able to adjust the output wavelength profile of all the lights connected to the system, but also that of subgroups of light fixtures as small in number as only one, to that desired to accommodate various crops throughout the greenhouse or growth chamber.

Another great advantage of an automated system, in accordance with one or more embodiments of the present disclosure is the added ability to adjust lighting requirements (and of course, spectral profiles) in real time. These are referred to as light recipes. For example, in the northwestern hemisphere, the United States, where poinsettias are grown for the Christmas holidays, the plants must be conditioned with light and dark-times of twelve hours, each, for a period of one month starting at the end of September. Instead of having to turn all lights on simultaneously, which may cause an undesirable peak demand on electric power, only the required wavelength lights could be programmed to come on gradually to their required intensities, minimizing undesirable peak demands and power utilization without the need for the operator to be physically present in the growing environment to conduct the transition. Other benefits of gradually increasing the intensity of light are being studied. It has been suggested that it may be beneficial to introduce and remove light to and from many plants through a gradual increase or decrease in intensity of various wavelengths, much like the sun provides when it rises and sets each day. An option available to the digital control interface 12 is a network connection in the form of wireless 18 or direct network connection 16 (e.g., Ethernet, HPIB, S-bus, etc.), across which the user inputs would be transmitted to the light fixture(s).

In addition to all these other benefits offered by the digital control interface 12, another benefit is telemetry. One can monitor the status of light fixtures without having to be in close proximity to or even see them. The user can set outputs and monitor the status of each channel concerning channel drivers 22, 24, 26, 28, 30, 32, 34, and 36, within each light controlled by this interface on any computer or hand-held smart device, etc. Although this LED lighting system's reliability exceeds that of most, if not all other types of greenhouse lighting systems, there can be rare failures. Fortunately, most failures in this system can be readily identified through the telemetry displayed on the graphic user interface. This simplifies maintenance insomuch as the faulty unit can be located by maintenance personnel with ease.

Among the telemetry options provided are voltage and current output of the master power supply 6, current through each LED string (channel) 38, 40, 42, 44, 46, 48, 50, and 52, voltage on each string (a voltage too high would indicate an open, too low may indicate shorted LED(s) or undercurrent) and temperature of each PC board (typically one for each four inch by twelve inch LED board).

In various embodiments, protection for over voltage and over temperature are provided through the control device 8 of FIG. 1 within each light fixture. Additionally, in certain embodiments, for a series string of LEDs, a failure that causes an open circuit will result in the loss of the entire channel of LEDs. In order to prevent this total loss of a channel in at least one embodiment of this system, there are incorporated crowbars across each LED that turn on whenever an LED failure results in an open circuit. This ensures that the only loss the light would experience would be that of the single failed LED.

In another embodiment of the present disclosure, sensors 38a, 40a, 42a, 44a, 46a, 48a, 50a, and 52a are provided as shown in FIG. 1, and may be placed to sense light intensity of each of the channels 38, 40, 42, 44, 46, 48, 50, and 52, and/or of the LEDs of each of the channels, thus allowing direct intensity telemetry and the option of a closed loop control lighting system. An embodiment of one such LED and light sensor 38a is shown in FIG. 3B. In at least one embodiment, the closed-loop signal flow of one of the control loops is as follows: a command signal is generated in the digital control interface 12, sent across the control and telemetry bus 2 to the respective channel driver, (22 in this example), which generates a current in the string of its respective LEDs, which in turn induces a corresponding intensity of light to be emitted from that string of LEDs (38 in this example). A sensor placed in close proximity to one of the LEDs and the corresponding string of LEDs (38a in this example) responds to the light emitted from that diode sending a telemetry signal back through the control and telemetry bus 2 to the digital control interface 12. At the digital control Interface 12, the telemetry signal is compared to a reference signal, supplied by user inputs 20b, generating an error signal, which causes the control output of the digital control interface 12 to be increased or decreased as necessary to ensure that the telemetry signal is always equal to the reference signal at the inputs to a comparator of the digital control interface 12. This completes the full control loop of one of as many as eight channels within the LED light system. In this manner, the light intensity of each LED of the plurality of LEDs of sets or strings 38, 40, 42, 44, 46, 48, 50, and 52 can be sensed to make sure that a plant or vegetation is always getting the proper light intensity. The control device 8 may include a computer processor and memory, programmed so that the light intensity of sets 38, 40, 42, 44, 46, 48, 50, and 52 is adjusted in response to sensed light intensity from the sensors 38a, 40a, 42a, 44a, 46a, 48a, 50a, and 52a, respectively.

In various embodiments, the digital control interface 12 of FIG. 1 comprises a programmatic user interface. Accordingly, such a programmatic user interface includes a graphical user interface (GUI), as shown, in part, in FIG. 12, that is stored in a memory component of the light fixture 200 or in an interface device such as a router module that is accessible by the user through a smart device or computer. In various embodiments, the router module may be an external component that is separate from the lighting fixture(s), in various embodiments. As an alternative to housing the GUI on the router module, it can be housed on any light within its communication interface/module 14, in a cloud, a file on computer, website, mobile application, or smart device, where it would serve as a communication broker. The option of housing the router module on a light may be particularly advantageous for smaller systems, where the lights are few in number, are placed close to each other and in close proximity to the smart device controlling the lights.

Figure 13:
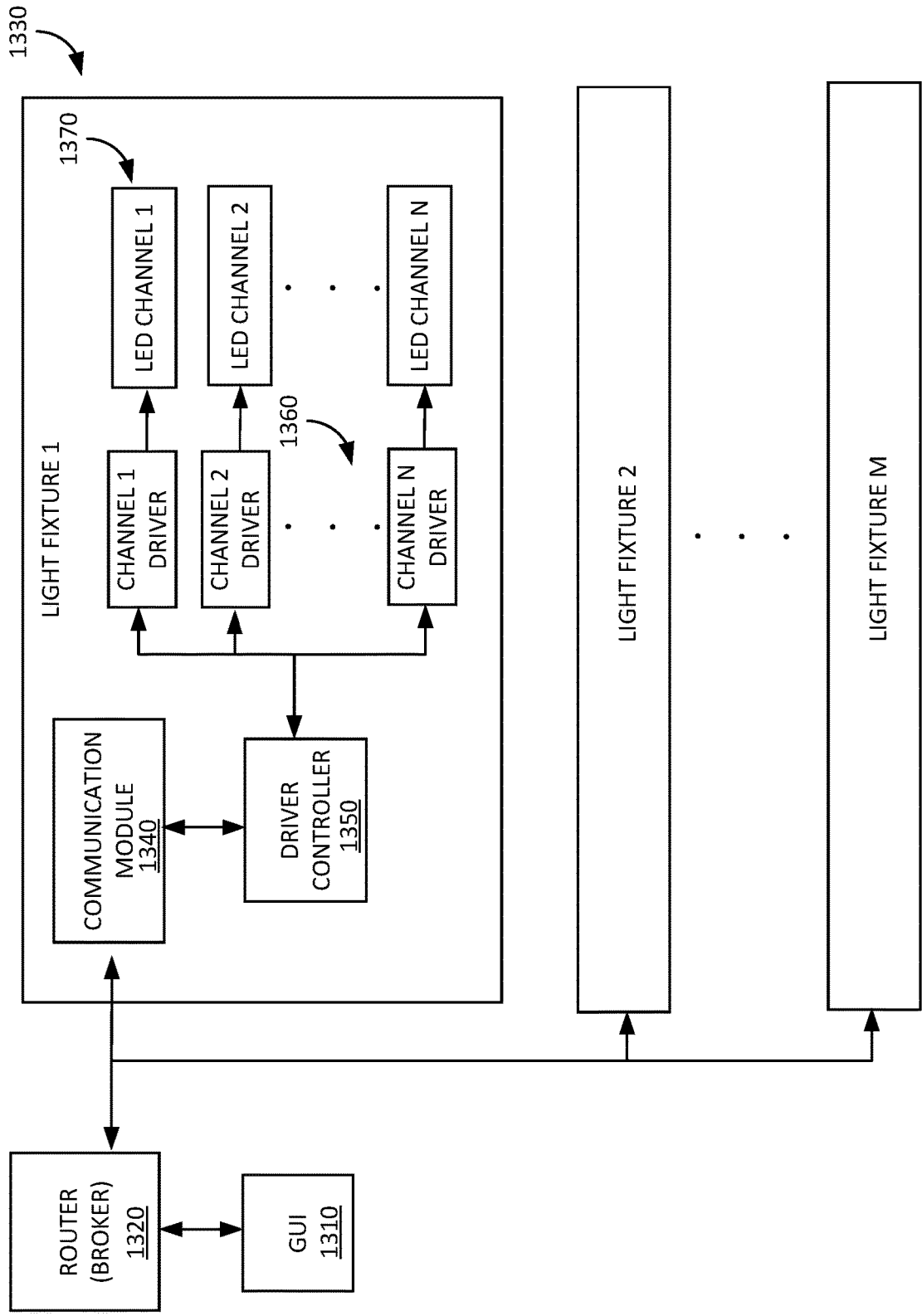
FIG. 13 shows a block diagram of a control system of the LED lighting fixture that includes the graphical user interface (GUI) of FIG. 12 in accordance with various embodiments of the present disclosure.

Referring now to FIG. 13, an exemplary control system 8 is comprised of the digital control interface 12 and one or more LED light fixtures 200. The block diagram of FIG. 13 shows basic elements of the control system, that include the graphical user interface (GUI) 1310, a router module 1320 (where the GUI can be housed), and one or more of the LED light fixtures 200, 1330, each of which includes a communication interface/module 14, a light controller (PSoC), a plurality of LED drivers (one for each independent string of LEDs), and a plurality of independent LED strings 38, 40, 42, 44, 46, 48, 50, 52 (e.g., up to 8 independent LED strings).

The GUI 1310 serves as the visual input/output (I/O) of the lighting system. In certain embodiments, it is essentially an interactive website or mobile application to which the user logs in to and manipulate the controls to produce the desired response of a connected light or system of lights. The GUI 1310 invokes a desired response in the light fixtures 1330 through a private bidirectional communication (WiFi) link between the fixture and the communication module 14 on board each of the light fixtures 1330 through a series of unique codes. In various embodiments, the Graphic User Interface 1310 resides on the router module 1320, which serves as a communication broker between the GUI 1310 and each light fixture 1330.

In various embodiments, the router 1320 serves as a communication director or broker between the GUI 1310 and the light fixtures 1330. It transmits codes to and from each of the communication modules 1340, 14 (FIG. 1) onboard each of the light fixtures 1330, 200 (FIG. 7) within a network of light fixtures. Alternatively, the functionality of the communication broker can reside within the communication module 1340 of one of the light fixtures 1330. This may be more appropriate for small systems of lights (few in number) where there is no obstruction between each of the light fixtures and a controlling device. This offers the advantage of a more simplified system by eliminating an external device. The communication broker 1320 is essentially transparent to the user. As such, for sake of the following description, it is assumed that communications between the GUI 1310 and communication module 1340 funnels through the router module 1320.

In various embodiments, the communication module 1340 serves as the main WiFi transceiver on board each of the light fixtures 1330. The communication module 1340 "looks" for and automatically connects to its associated and closed WiFi network. If a light fixture 1330 is removed, or powered down, the communication module 1340 detects this occurrence and sends a "last will and testament" notice to the GUI 1310, which in turn, indicates that drop off to the user. As described above, the communication module 1340 communicates directly with the GUI 1310, receiving commands generated in the GUI and sending telemetry information back to it from its light fixture 1330. In addition to its role as a communication interface, the communication module 1340 performs code translations and other computations on the codes between GUI 1310 and the driver controller 1350. This ability to handle many of the higher-level tasks required by the light fixture 1330 is critical to the complex operation and speed required by the available lighting functions of the lighting system. In various embodiments, a copy of the entire GUI is also housed in the communication module 1340. This allows the router module 1320 to reside on one of the light fixtures in smaller systems, eliminating the need for an external router component. Telemetry from each light fixture 1330 can be monitored in the GUI 1310 by selecting the light of interest in a "Lights" panel. Depending on the model of light, one can monitor any of the 21 following telemetries from any one of the lights: bus voltage (see FIG. 12), bus current (see FIG. 12), voltages from each of the channels (FIG. 12), currents from each of the channels (see FIG. 12), driver board temperature and temperature of each of the two LED boards (see arrow E of FIG. 12).

In various embodiment, the driver controller 1350 is an on-board microprocessor, Programmable System on a Chip (PSoC), which communicates with the communication manager 1340 and controls all LED drivers (channel drivers) 1360 that, in turn, regulate the current through their respective strings of LEDs based on a set of parameters (Parameter Set) it receives from the communication module 1340. In addition, LED string voltages, their corresponding currents, input bus voltage, and its corresponding current, as well as temperatures from the two LED boards and driver board, are received and translated into standard units of measure by the driver controller 1350. Then, these data are sent to the communication module 1340 where they are passed on to the GUI 1310 through network communications (e.g., network messaging using the MQTT protocol). The driver controller 1350 also provides the vital function of startup. During startup, the driver controller 1350 sets all output channel currents to their previous operational states. This is especially vital during periods of power outages. For example, after a power outage, when power returns it is important that the light returns to its previously set operational parameters.

The LED driver 1360 controls its string of LEDs 1370 as directed by the driver controller 1350. There are two basic modes of operation: Direct Current (DC) and Pulse Width Modulation (PWM). In DC mode, the LED current is controlled directly, varying as and if directed by the driver controller 1350. In PWM mode, the LED string current is set to a specific level and also "chopped" pulse width modulated to reflect the desired average LED string current. Critical to providing very low intensities of light from the LEDs is the ability to adjust not only the pulse width, but also the maximum current level to which the string will be driven during its on-time. This is a unique feature of the exemplary lighting system of the present disclosure.

In various non-limiting embodiments, there are up to eight LED strings 1370, one string for each of channel in each LED light fixture. Accordingly in various embodiments, there may be more than eight LED strings and channels.

These LED strings (channels) are directly controlled by the LED drivers 1360 under the control of the driver controller 1350. LED string voltages and currents are sensed at these LED driver locations and sent back to the driver controller where they are scaled and sent on to the communication module. These telemetries can also be assessed for out-of-bounds conditions. This is useful in detecting a failure, should it ever occur.

Accordingly, in various embodiments, a user communicates with and controls a light fixture or system of light fixtures using a smart device or computer by accessing the GUI 1310 through a wireless network. Bidirectional information is transferred between the GUI 1310 and the on-board communication modules 1340 in each of the light fixtures 1330 in the network via network communications (such as, but not limited to, network messaging using an MQTT protocol, among others). Using the GUI 1310, a user sets parameters needed to adjust the light(s) and read telemetry through a series of panels that generate, send, and receive the required codes to and from the communication modules 14 of each of the lights on the network. These codes transmit the desired settings and perform many other lighting system functions. Telemetry from each light can be monitored in this same GUI.

Figure 12:
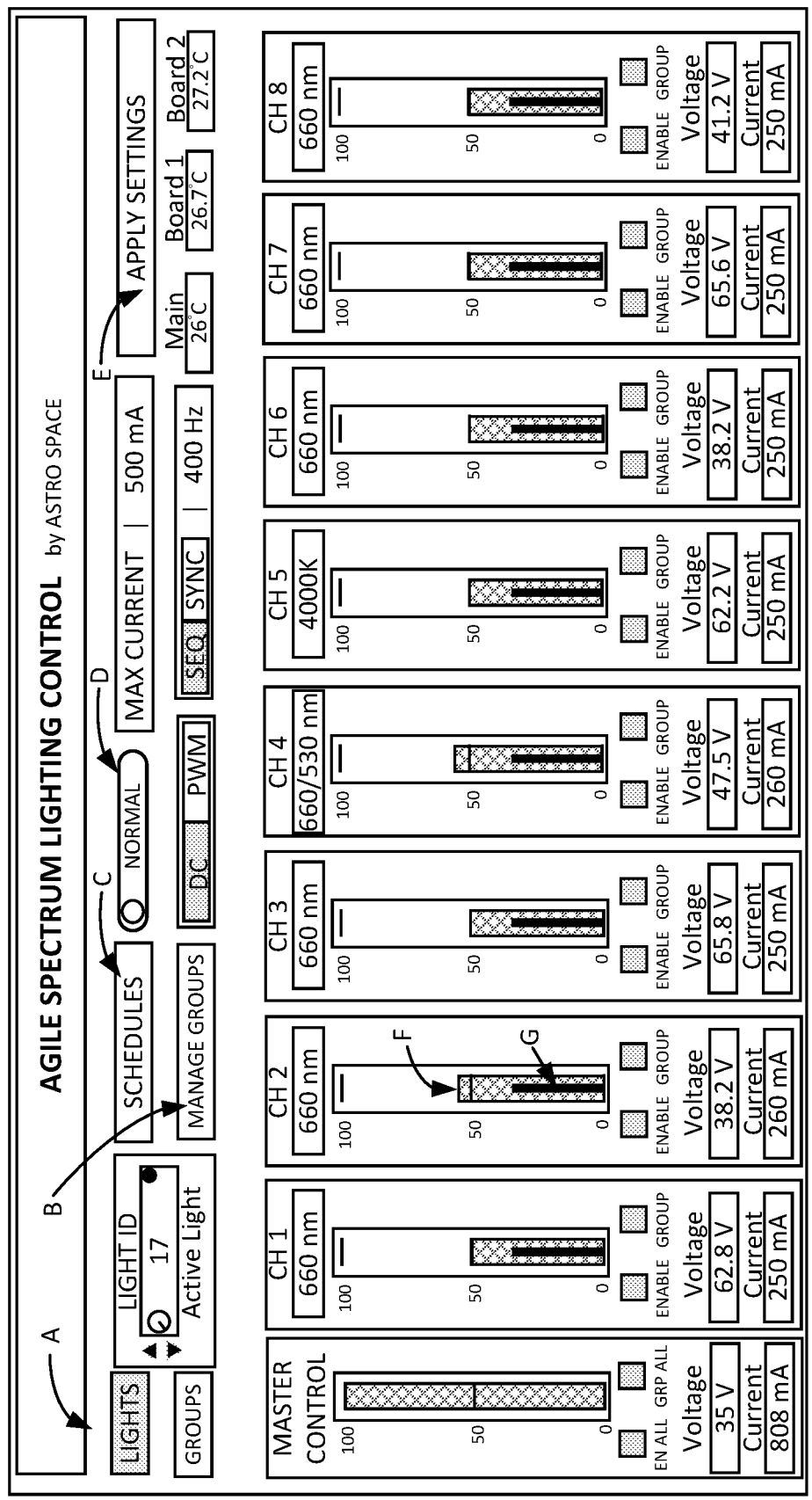
FIGS. 12 and 14 show the "LIGHTS" panel of the graphical user interface (GUI) used to control the LED lighting fixture of FIG. 10 in accordance with various embodiments of the present disclosure.
Figure 14:
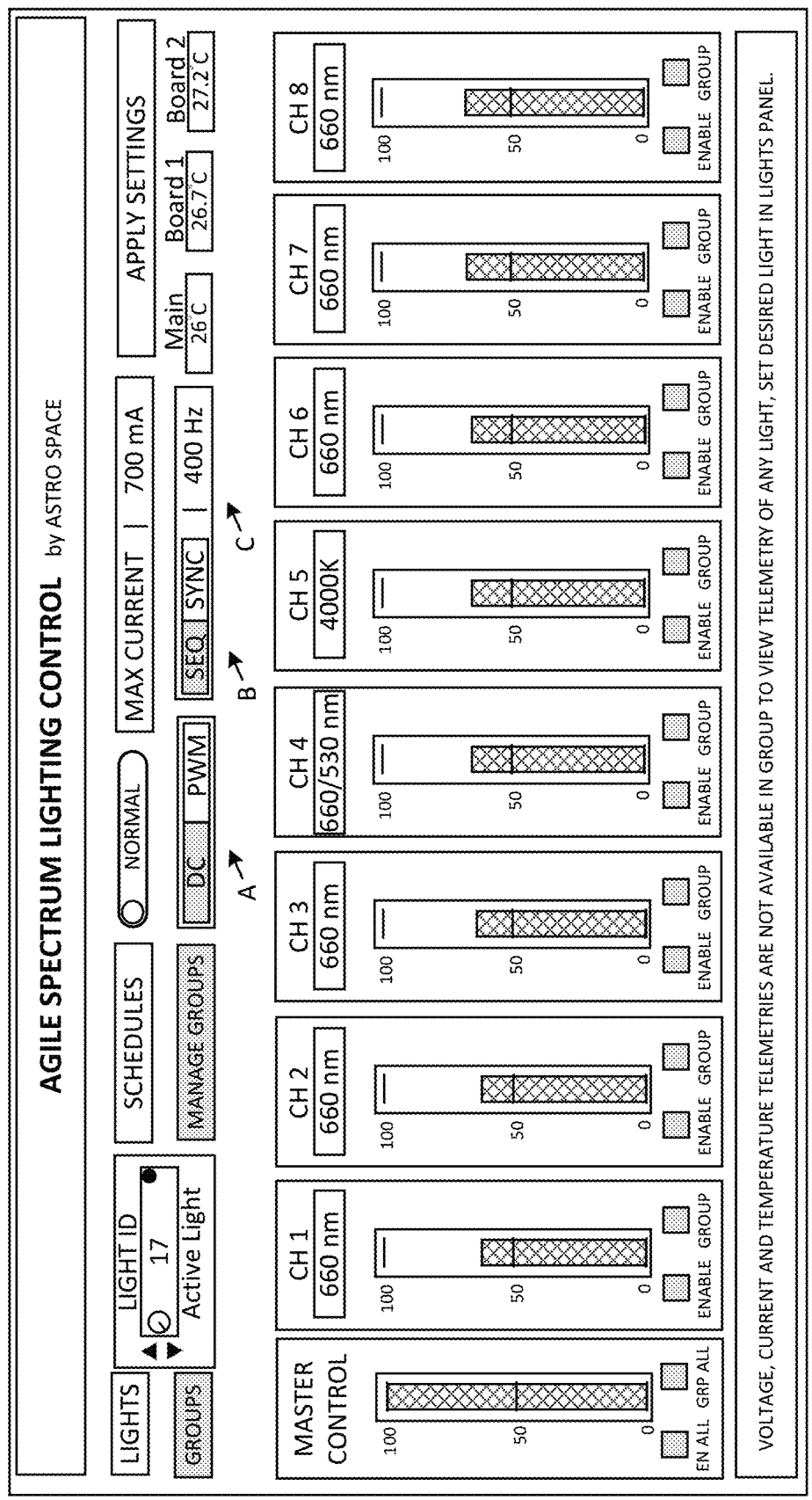

The GUI software interface 1310, as described above, serves as the avenue by which a user communicates with the lighting system. Referring to arrow A in FIG. 12, there are two basic main panels: LIGHTS mode and GROUPS mode. In FIG. 12, the "LIGHTS" mode has been selected, whereas in FIG. 14, groups mode has been selected. Correspondingly, in LIGHTS mode (see FIG. 12), a user has the ability to select a specific light of which the user wants to modify its parameters. In this mode, in addition to being able to modify parameters, the user can also see the telemetry of the selected light, as well as the temperatures and input bus voltage and current telemetries.

In GROUPS mode (see FIG. 14), the user has the ability to select a specific group for which the user wants to modify its lights parameters. In this mode, the user has the ability to modify the parameters of ALL of the lights within the group (all lights within the group selected will inherit the parameters). The user cannot see any of the telemetries, since the user is now working with a group and not an individual light. However, once the user has set the parameters for the group, the user can then go into LIGHTS mode to see the operating conditions of any particular light.

In either the LIGHTS or GROUPS mode, the user can input the maximum current to which the LEDs can be driven. The slider controls set the percentage of that maximum current in milliamperes (mA) by moving a slider control to the desired value. For example, with the maximum current set to 500 mA, the Master Control set to 100 and a channel set to 50, the resulting current in that LED string would be controlled at 100%×50%×500 mA=250 mA. The Maximum Current setting is global, meaning it applies to all settings and modes of operation, in various embodiments. Also, one can choose the Driving Mode in which to illuminate the LEDs. As described above, there are two basic modes of driving the LEDs: DC and PWM (see FIG. 12). The calculation of average LED drive current is the same as DC for PWM. In various embodiments, if PWM is chosen, then a sequential or synchronized method of driving the channels can be selected and the PWM frequency can be adjusted from 1 Hz to 2 kHz (as indicated by arrows A, B, and C in FIG. 14).

Further, arrow F of FIG. 12 shows a graphical depiction of the level of intensity set for the individual channel and arrow G shows a telemetry bar representing the amount of current being applied to achieve the set intensity level. In the example shown in FIG. 12 for channel 2, the telemetry bar is shown to be at 52% of the maximum current (500 mA) which is 260 mA.

In various embodiments, the GUI software interface has a mode in which the power from one channel can be shifted/used by another channel so long as the input power of the light fixture stays at or below a set amount. For instance, if all channels are set at their maximum current (500 mA), the input power (to the light fixture, as opposed to the power supply supplying power to the light fixture) is about 270 Watts. If a user wants to shift input power to the red channel, the user can lower the percent current setting of the blue channel, which in turn lowers the input power, let's say by about ⅛ of the total input power or around 34 Watts. This difference in input power (34 W) can now be applied to the red channel or channels by increasing their current(s) to as much as the Absolute Current, thereby shifting the same amount of power toward the red spectrum. In this example, an absolute maximum current (Absolute Current) for any given channel would be in the neighborhood of 700 to 1000 mA. Without this feature, the user would only be able to lower the blue spectrum, which would lower the total amount of power to the plants. No light on the market can provide this "Spectral Power Sharing" capability.

In the Master Control slider box, a user can click Enable All to allow all channels to be enabled, as shown in FIG. 12. When the Enable All button is enabled, the Enable All button turns green in various embodiments, which indicates that all channels will be enabled and follow their respective settings. Correspondingly, if the Enable All button is displayed as being red, then this indicates that all channels are disabled and the LEDs will turn off when the APPLY Settings button is selected, as shown in FIG. 12.

Similarly, to allow all channels to be adjusted in synchrony, the Group All button can be selected (see FIG. 12), which will turn it and all group buttons within each channel green, in various embodiments. Accordingly, all the channels will be grouped for adjustment purposes (which is not the same as assigning lights to particular groupings, as discussed below). To remove all channels from the adjustment group, the Group All button can be selected again which will turn the buttons red, in various embodiments.

Figure 15:
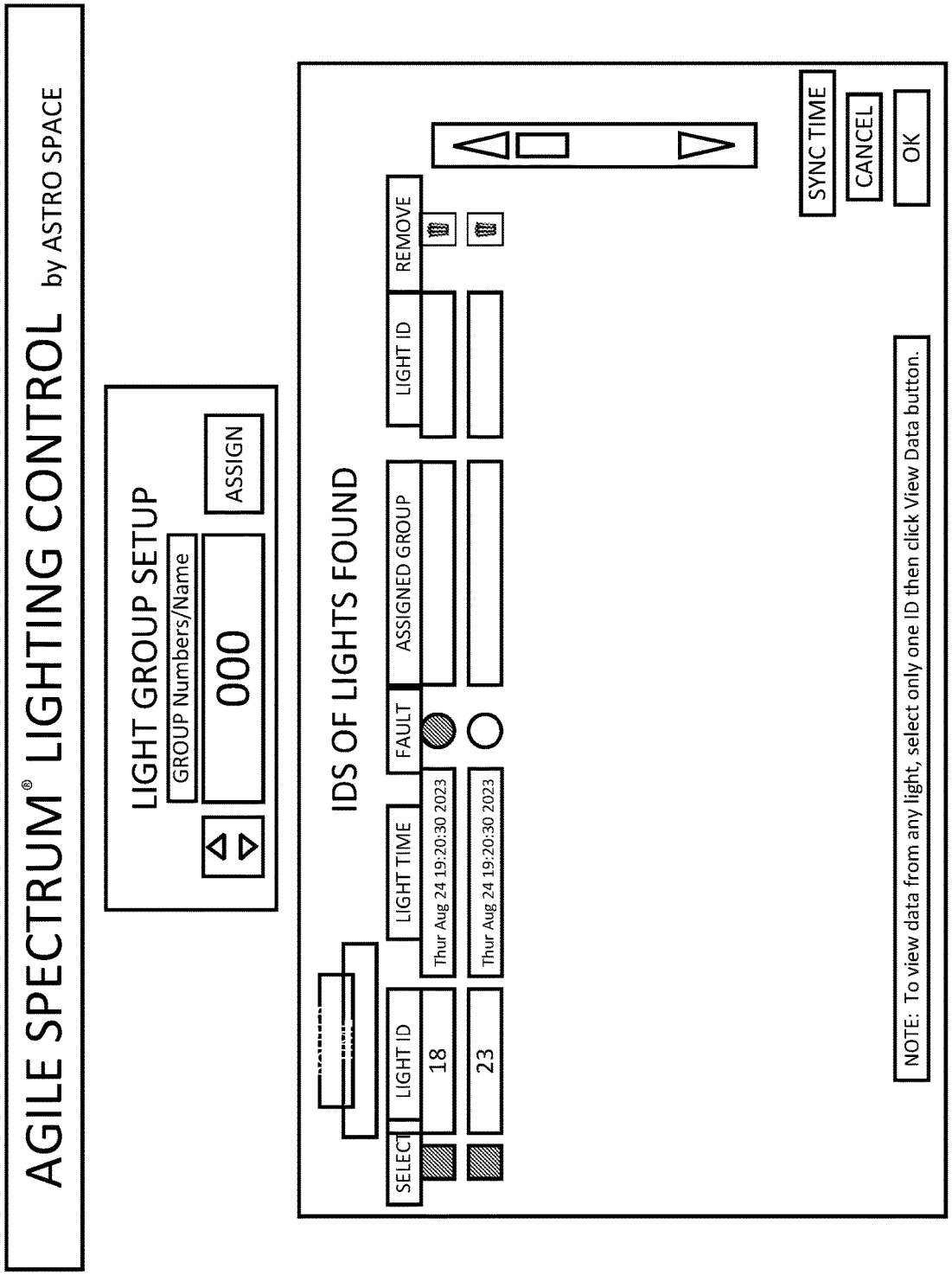
FIG. 15 shows "MANAGE GROUPS" control panel of the GUI software interface of the LED lighting fixture that enables setup of a group of LED lights in accordance with various embodiments of the present disclosure.

To setup or manage a group of lights, a Manage Groups control can be selected from the GUI software interface (see arrow B in FIG. 12). Accordingly, FIG. 15 shows a GUI screen for light group setup. In "MANAGE GROUPS", one can select individual lights to include in any particular group. Here, the user can create and name a new group or modify an existing group. Light groups are exclusive, meaning each light can only be assigned to one group at any given time. Once the lights are selected for inclusion in a group that is being created or modified, selecting the Assign control 1510 causes the lights to be assigned to the group.

To set a schedule of lighting events, a Schedules control can be selected from the GUI software interface (see arrow C in FIG. 12). Schedules allows a user to set schedules of lighting events. A schedule is comprised of one or more events and can be either single or repetitive. As an example, using multiple events, the user can establish a schedule that mimics a diurnal cycle. In various embodiments, schedules can only be applied to groups. However, if the user wanted to create a schedule for only one light, the user could place it in a group, by itself, and then set its schedule as desired. For instance if one needed to simulate a sunrise and/or sunset, the user could create a set of PRESETS (schedule) that would cause the lights in the group to change intensities of individual channels to achieve a close approximation to a true sunrise and/or sunset. This can be either a single event or a repetitive schedule in which case it could mimic a diurnal variation.

Figure 16:
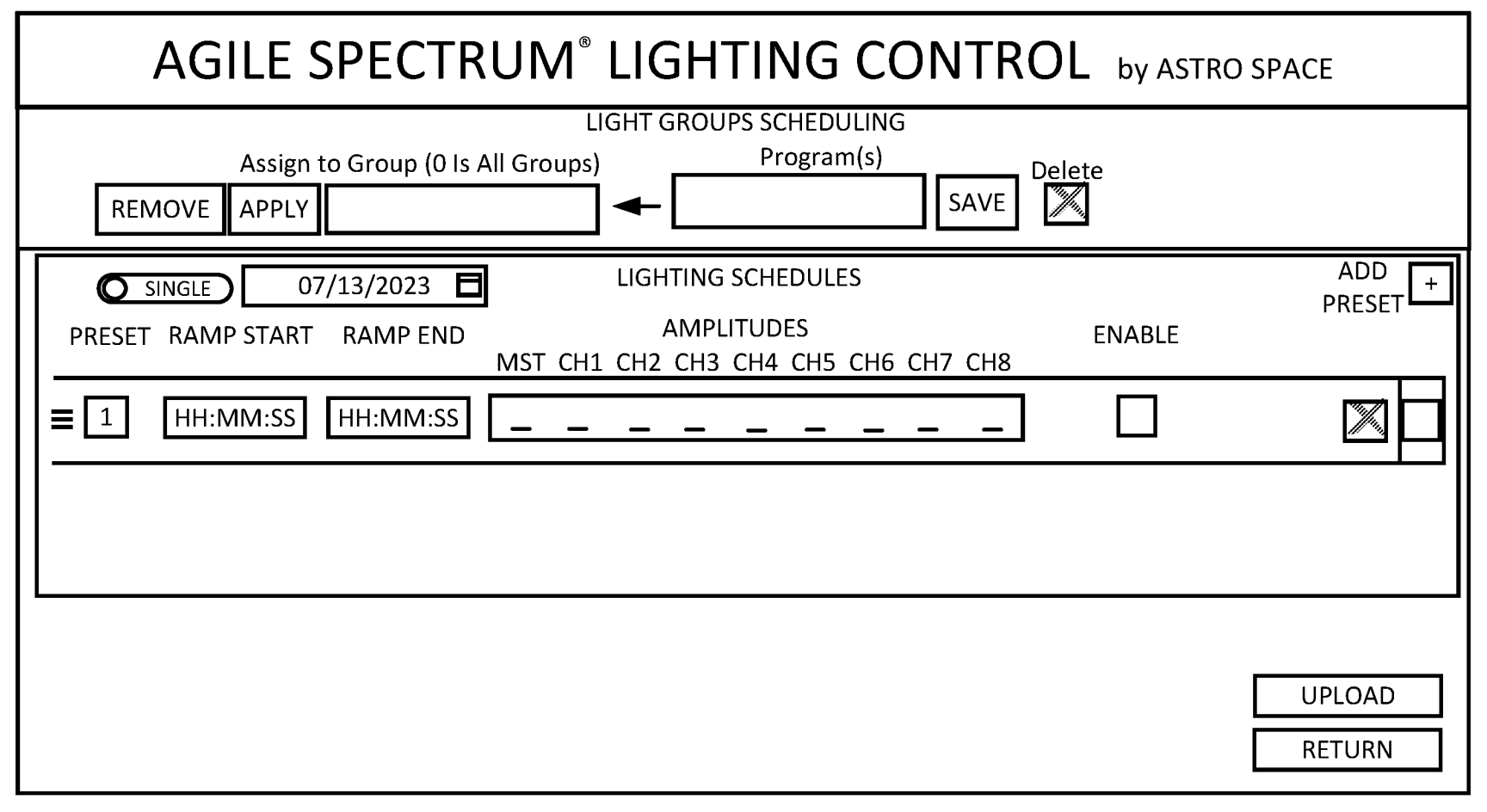
Figure 17:

As shown in FIG. 16, a Light Groups Scheduling GUI panel allows the user to (1) establish a schedule (a set of one or more presets settings (e.g., light amplitude settings)) for a given group; (2) add presets if needed; (3) save a schedule (a set of presets) as a desired schedule name; (4) recall a schedule that has been previously saved; (5) delete a previously saved schedule; (6) choose a SINGLE event, as shown in FIG. 16, or a RECURRING schedule, as shown in FIG. 17, to determine the repetition of the schedule; (7) select a start date to establish the start (by date) of the program; and/or (8) if setting a recurring event, select an end date. And for each preset, as shown in FIG. 17, the user can (i) set a ramp start time to indicate the time of day for scheduled amplitude changes to begin; (ii) set a ramp end time to indicate the time of day for scheduled amplitude changes to be fully applied and to come to a conclusion; (iii) set channel amplitudes, as shown in FIG. 18; and/or (iv) select whether each preset is active or (v) the user can delete any preset.

A schedule can be imported from a spreadsheet template (e.g., Microsoft Excel®) by selecting the UPLOAD button, making the task of programming the presets much easier. Various "recipes" can be stored and recalled using the UPLOAD feature.

Figure 18:
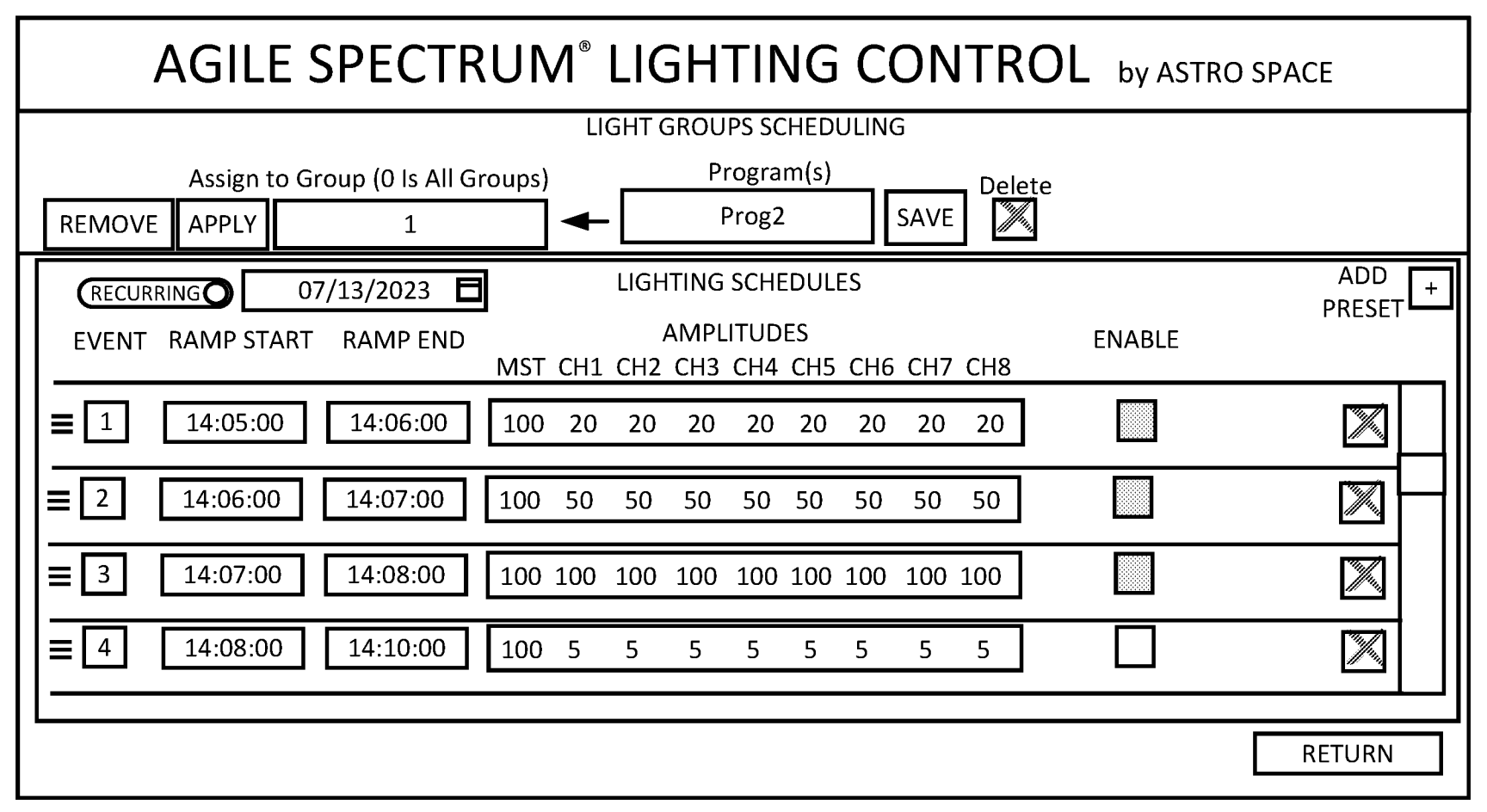

Referring to FIG. 18, events can be organized by dragging them in the user's desired order. But, the order in which the events effect the lights is dictated by the start and end dates set in the schedule, and not the order by which they are displayed. Enable controls are provided to enable and disable any of the individual scheduled events or presets.

Figure 19:
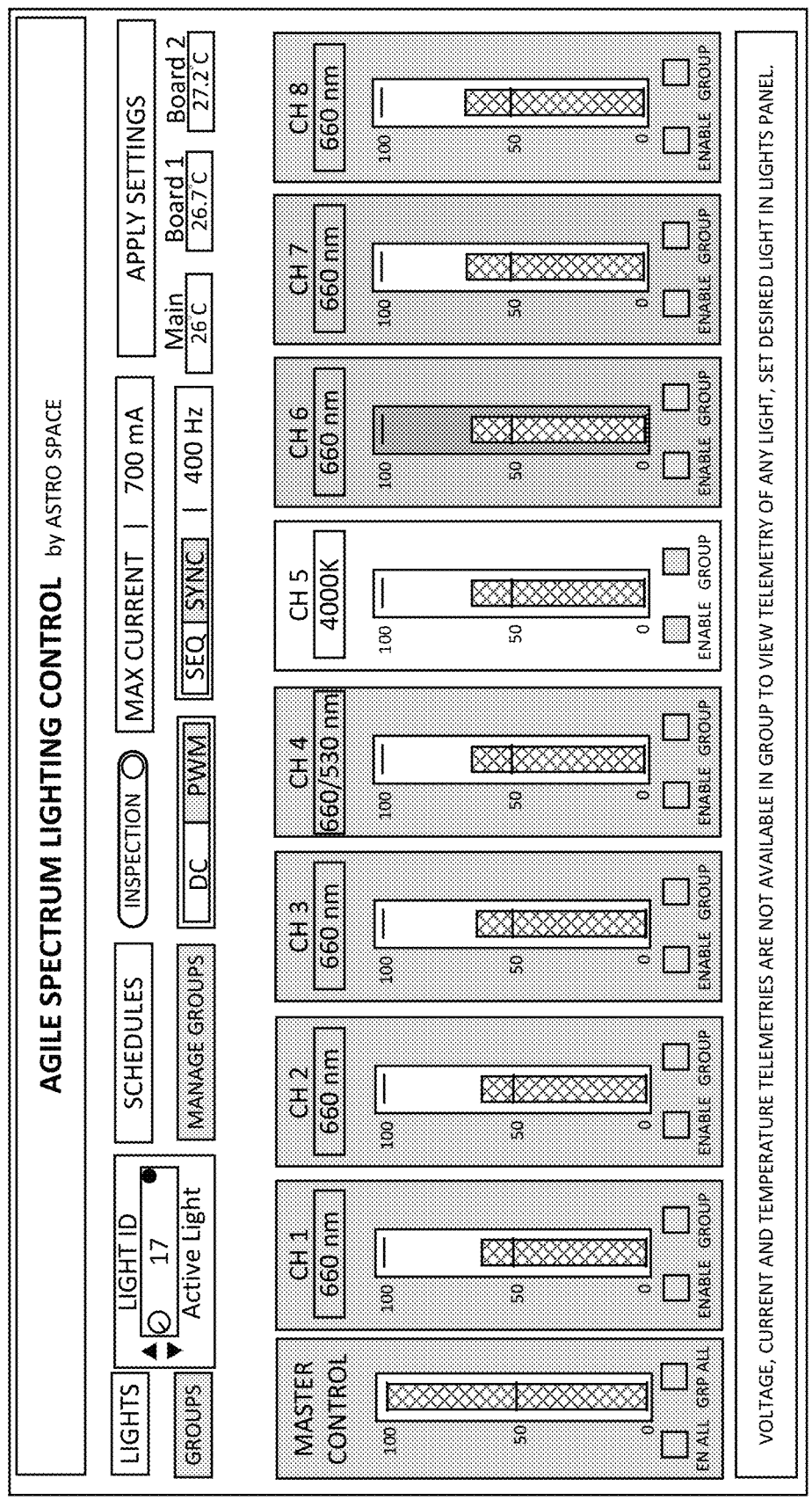
FIG. 19 shows a "GROUPS" control panel of the GUI software interface of the LED lighting fixture under an inspection mode in accordance with various embodiments of the present disclosure.

To setup an inspection mode, a Normal/Inspection control can be selected or toggled from the GUI software interface (see arrow D in FIG. 12). As shown in FIG. 19, the inspection mode allows the user to quickly switch the lighting spectrum to white light so that inspection of plant health, genotype, etc. can be easily made by the human eye. This is of course only if the lights are equipped with white LEDs in one of the channels. In this case, channel 5 is outfitted with 4000K LEDs, in various embodiments. When in inspection mode, only the channel with white LEDs will be available to adjust. All other channels as well as the Master Control will be grayed out as shown in FIG. 19.

Figure 7:
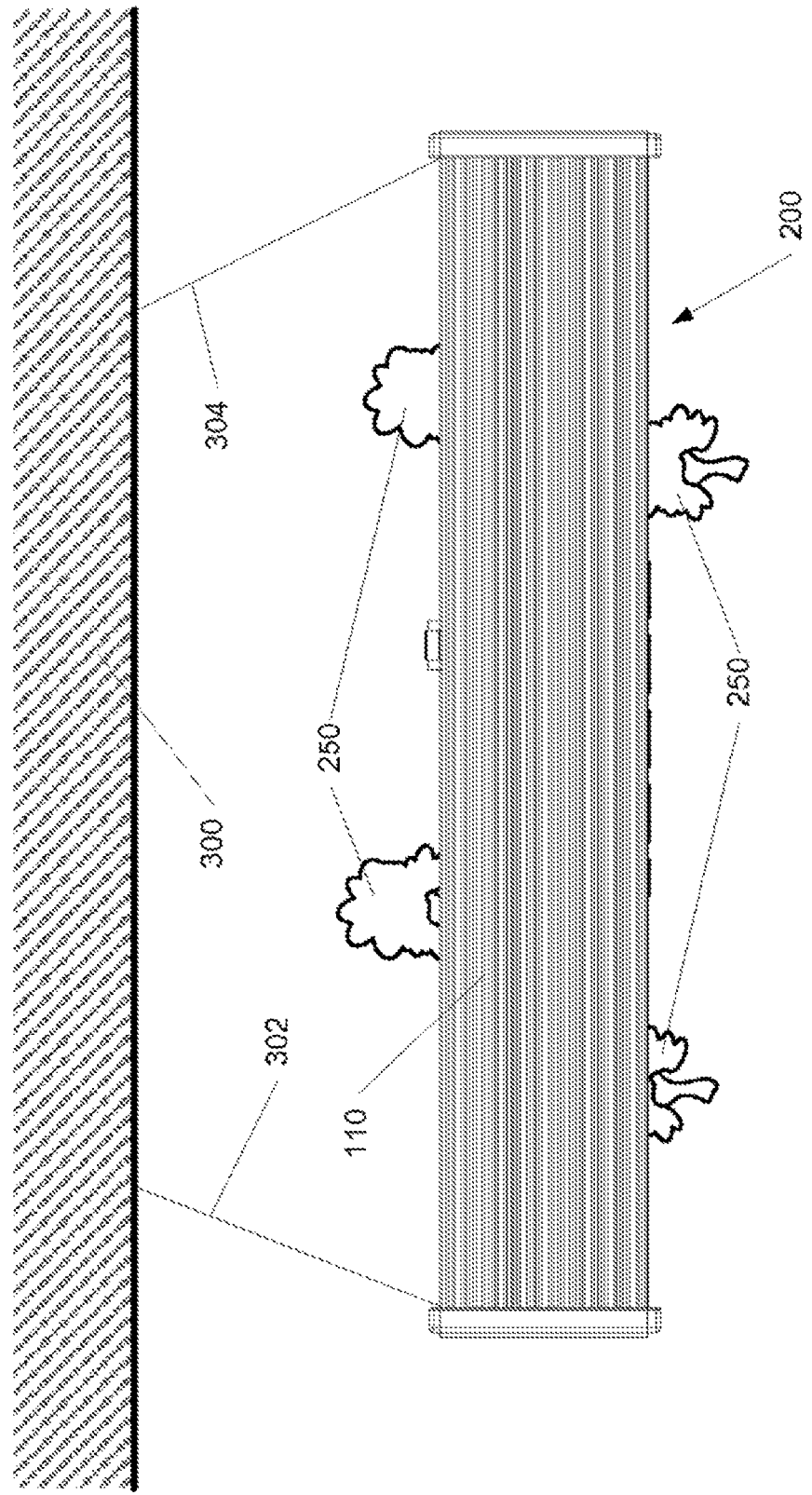
FIG. 7 shows a diagram of one embodiment of the design, method, apparatus, and system, mounted by cables, to a wall or other structure. This is an example of a horizontally mounted, omnidirectional, lateral emitting, LED light fixture (light is emitted away from you, as drawn here).
Figure 8:
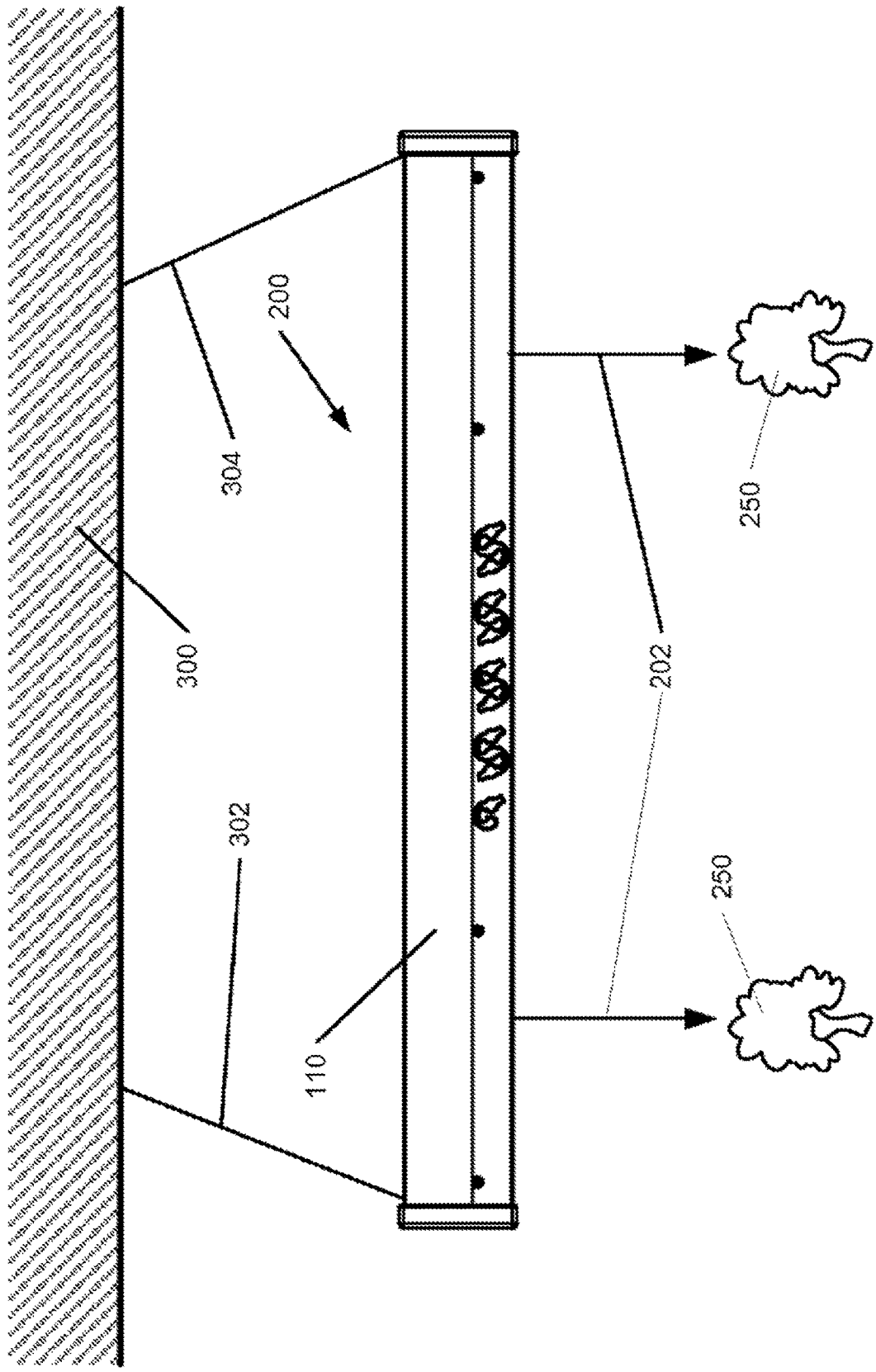
FIG. 8 shows the device of FIG. 7, mounted by cables, to the wall, overhead or other supporting structure, with the mounting in a different orientation from FIG. 7.
Figure 9:
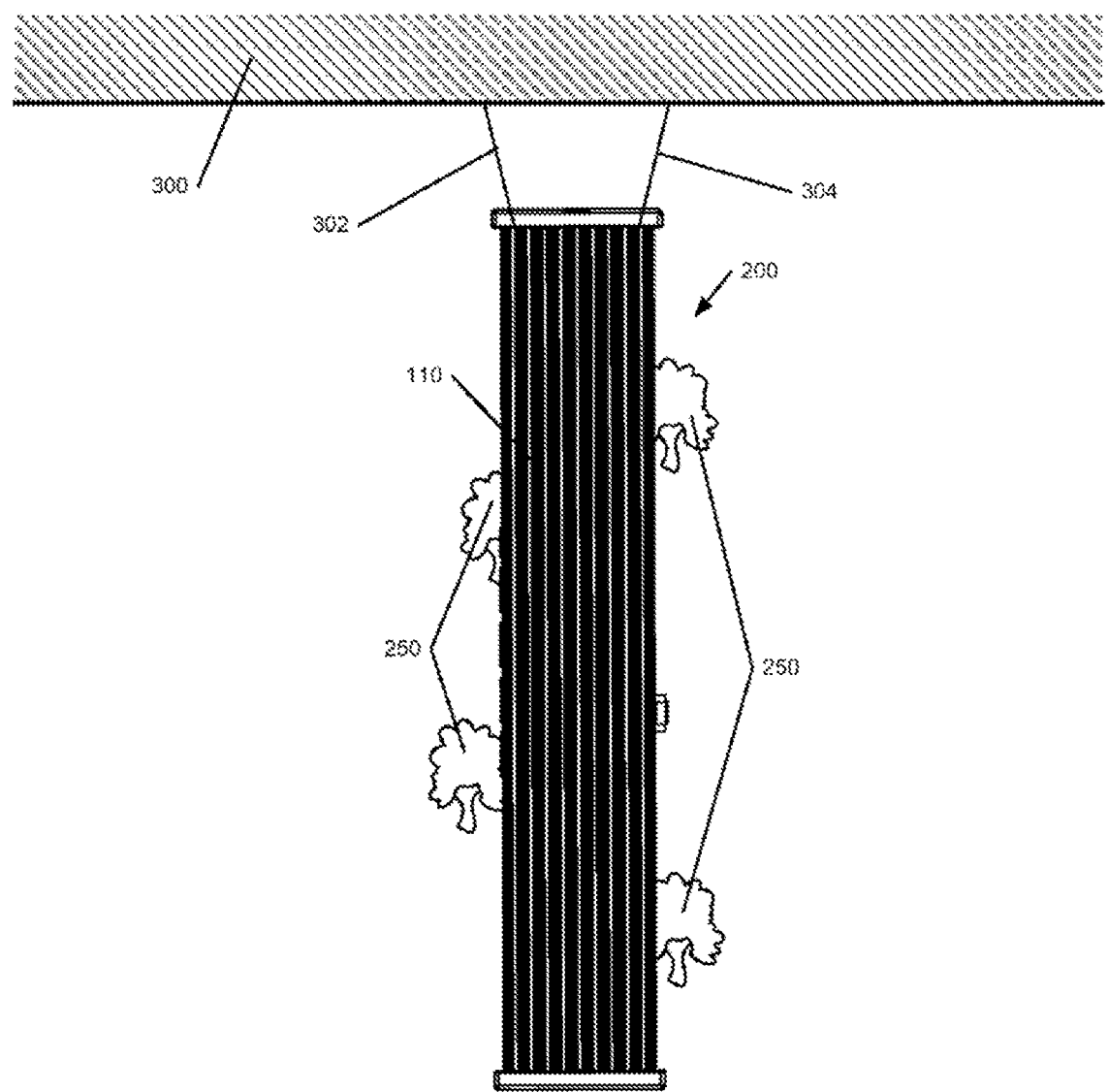
FIG. 9 shows the device of FIG. 7, mounted by cables, to a wall, overhead or other supporting structure, so that the LED lighting fixture is mounted in a different orientation from FIGS. 7 and 8. This is an example of a vertically mounted, omnidirectional, lateral emitting, LED light fixture in which light is emitted away from you, as drawn.

The light system, apparatus, and/or method may be mounted either horizontally with heat sink fins facing laterally (lateral omnidirectional illumination), horizontally with heat sink fins facing up (vertical illumination), or vertically (vertical omnidirectional illumination) with, of course, heat sink fins facing in any direction, all mountings of which are as shown in FIG. 7, FIG. 8, and FIG. 9, respectively.

Referring now to FIG. 7, the figure shows a diagram of an LED lighting fixture 200 mounted by cables 302 and 304, to a wall 300, or other structure. This is an example of a horizontally mounted, omnidirectional, lateral emitting, LED light fixture (light is emitted away from you, at the vegetation 250, as drawn here).

FIG. 8 shows a diagram of a horizontally mounted, vertical emitting, LED light fixture (light is emitted down, as drawn here). This is an example of an LED lighting fixture 200, mounted by cables 302, 304, to the wall overhead or other supporting structure 300, with the mounting in a different orientation from FIG. 7. FIG. 8 also shows the direction 202 of light emitted from the plurality (PC board) of LEDs 101 (not shown). This is an example of a horizontally mounted, vertical emitting, LED light fixture (light 202 is emitted down, towards the vegetation 250, as drawn here).

FIG. 9 shows an LED lighting fixture 200, mounted by cables 302, 304 to the wall or structure 300, so that the LED lighting fixture 200 is in a different orientation from FIGS. 7 and 8. This is an example of a vertically mounted, omnidirectional, lateral emitting, LED light fixture in which light is emitted away from you, towards the vegetation 250, which are behind the light, as drawn. The LED lighting fixture 200 may be controlled manually or by a computer processor, which may be set and communicated to via another smart device over a wired or wireless network.

FIG. 10 shows a top view of a diagram of a typical twenty-four inch LED lighting fixture 200 of an LED light fixture model (viewed from fin-side of heat sink). FIG. 11 shows an apparatus 400, including LED lighting fixtures 200p, 200s and master power supplies 6p, 6s, in accordance with another embodiment of the present disclosure. Each of the two heat sinks 200p, 200s may be the same as heat sink 110. Each of power supplies 6p, 6s may be the same as power supply 6, or combined into one supply. FIG. 11 is a diagram of at least one configuration of a dual twenty-four inch LED light fixture model (viewed from heat sinks), that would typically be deployed in large growing areas and greenhouses. Twin four inch by twelve inch lighting fixtures 400 in FIG. 11 can be used to replace existing high-pressure sodium, metal halide, or florescent lighting fixtures in large chambers or greenhouses. As many as one thousand lighting fixtures (optionally more) can be controlled with this system. A twelve inch configuration of the lighting fixture is possible and is similar to, but of course shorter than, that of FIG. 10, above.

Systems and methods of the present disclosure are designed to provide illumination beyond the standard spectral range definition of Photosynthetically Active Radiation (PAR) due to numerous research studies indicating photosynthesis and plant morphology occurs in the spectrum beyond the generally accepted range of 400 to 700 nm definition of PAR. This variability, versatility and spectral range will allow researchers and growers to determine the most efficient light program/recipe which will reduce energy costs while maintaining or increasing plant growth. Much research has focused on red and blue frequencies and their effect on photosynthesis, often neglecting the impact of middle spectrum frequencies. One might assume that the middle spectrum frequencies are not needed based on the green color of most plants. This assumption is false, but understandable based primarily on the human eye's peak receptivity at 555 nm, between green and yellow frequencies.

Typical indoor grow operations and supplemental lighting grow requirements have utilized metal halide or high vapor pressure sodium lights in an attempt to mimic or replace the solar spectrum. While full sun is not needed for optimal growth, many of the component frequencies are needed to induce photosynthesis and the various critical stages of plant or crop development. An exemplary system of the present disclosure can be programed to provide the critical frequencies via a time based light recipe to initiate key stages of development. With focused efforts towards a particular crop's development, its growth be accelerated, thus increasing return on investment (ROI) for an indoor grow facility.

Systems and methods of the present disclosure can provide intermittent illumination of an individual frequency channel or all channels. Studies as far back as 1905 indicate some benefits to photosynthetic efficiency when subjected to pulsed light. More recent studies have found less or no advantage, but have shown plant growth is not diminished by pulsed light in sufficient values. Accordingly, system and methods of the present disclosure can utilize a pulse width modulation (PWM) mode to save energy illumination costs and also reduce cooling costs by eliminating unnecessary heat from illumination. Depending on duty cycles of illumination requirements, peak electricity load demand can be reduced further decreasing energy costs. Additionally, systems and methods of the present disclosure can be configured to simulate sunrise and sunset as well as simulate seasonal changes in the solar spectrum to create plant morphology actions needed to trigger critical seasonal development. Thus, such systems and methods are customizable to meet specific requirements of various crops and operational needs.

Aspects of certain embodiments of the present disclosure can be implemented in hardware, software, firmware, or a combination thereof. For example, in certain embodiment(s), GUI 1310 is implemented in software or firmware that is stored in a memory and that is executed by a suitable instruction execution system. Accordingly, such software or firmware can comprise an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

If implemented in hardware, as in an alternative embodiment, the GUI can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present disclosure are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure and protected by the following claims.

Therefore, having thus described the invention, at least the following is claimed:

1. A system comprising:
   at least one light emitting device comprising a plurality of channels, each channel of the plurality of channels including one or more light emitting diodes configured to emit light at a respective predominant wavelength;
   a plurality of direct current drivers, each direct current driver of the plurality of direct current drivers supplying power to a respective channel of the plurality of channels;
   a router module that is configured to communicate with the light emitting device; and
   a digital control interface having a graphical user interface to specify and control a plurality of parameters of each channel of the plurality of channels, wherein the plurality of parameters enable adjustment of a spectral content, intensity, and schedule of illumination, in addition to enabling a DC mode of operation or a pulse width modulation (PWM) mode of operation, wherein the graphical user interface is housed in the router module and/or the light emitting device, wherein the graphical user interface is configured to be accessed by a user device over a wireless network.

2. The system of claim 1, wherein the graphical user interface comprises an interactive website.

3. The system of claim 1, wherein the router module communicates with the at least one light emitting device over a bidirectional communication link.

4. The system of claim 1, wherein the router module is housed in the at least one light emitting device.

5. The system of claim 1, wherein the router module is housed externally to the at least one light emitting device.

6. The system of claim 1, wherein the graphical user interface displays telemetries of the at least one light emitting device, wherein the telemetries include a bus voltage, a bus current, voltages from each of the plurality of channels, currents from each of the channels, a driver circuit board temperature, and LED circuit board temperatures.

7. The system of claim 1, wherein the one or more light emitting diodes comprise 192 light emitting diodes.

8. The system of claim 1, wherein graphical user interface is configured to enable a user to adjust a pulse width modulation frequency in addition to a pulse width modulation current level.

9. The system of claim 1, wherein graphical user interface is configured to enable a user to specify the plurality of channels to be driven by sequential pulse width modulation or synchronous pulse width modulation.

10. The system of claim 1, wherein the graphical user interface is configured to enable a user to set a maximum current to which individual channels of light emitting diodes are driven, wherein the graphical user interface is further configured to enable the user to select a percentage of available power to be applied to other individual channels.

11. The system of claim 10, wherein the maximum current is 1000 mA or less.

12. The system of claim 1, wherein the graphical user interface is configured to enable a user to shift power used by one channel to another channel so long as input power of the light emitting device stays at or below a set amount.

13. The system of claim 1, wherein the graphical user interface is configured to enable a user to group lights into a particular group, wherein the graphical user interface is further configured to assign or change intensities for each channel of light emitting diodes in the particular group.

14. The system of claim 13, wherein the graphical user interface is configured to set a schedule of lighting events as defined by a user and to assign the schedule of lighting events to the particular group, wherein the particular group includes at least one light emitting device.

15. The system of claim 13, wherein the graphical user interface is configured to set a schedule of lighting events as defined by an external file.

16. A method comprising:
providing at least one light emitting device comprising a plurality of channels, each channel of the plurality of channels including one or more light emitting diodes configured to emit light at a respective predominant wavelength;
transmitting a graphical user interface to a user device, wherein the graphical user interface is configured to specify lighting parameters of each channel of the plurality of channels, wherein the lighting parameters enable adjustment of a spectral content, intensity, and schedule of illumination, in addition to enabling a DC mode of operation or a pulse width modulation (PWM) mode of operation, wherein the graphical user interface is configured to be accessed by a user device over a wired or wireless network; and
communicating with the light emitting device and sending the lighting parameters of the plurality of channels from the graphical user interface to the at least one light emitting device.

17. The method of claim 16, wherein graphical user interface is configured to enable a user to adjust a pulse width modulation frequency in addition to a pulse width modulation current level.

18. The method of claim 16, wherein graphical user interface is configured to enable a user to specify the plurality of channels to be driven by sequential pulse width modulation or synchronous pulse width modulation.

19. The method of claim 16, wherein the graphical user interface is configured to enable a user to set a maximum current to which individual light emitting diodes are driven, wherein the graphical user interface is further configured to enable the user to select a percentage of the maximum current to be applied for individual channels.

20. A non-transitory computer-readable medium comprising machine-readable instructions that, when executed by a hardware processor of a router module, cause the hardware processor to at least:
transmit a graphical user interface to a user device, wherein the graphical user interface is configured to specify lighting parameters of each channel of a plurality of channels of a light emitting device, wherein the plurality of channels include one or more light emitting diodes configured to emit light at a respective predominant wavelength, wherein the lighting parameters enable adjustment of a spectral content, intensity, and schedule of illumination, in addition to enabling a DC mode of operation or a pulse width modulation (PWM) mode of operation, wherein the graphical user interface is configured to be accessed by the user device over a wireless network; and
communicate with the light emitting device and send the lighting parameters of the plurality of channels from the graphical user interface to the light emitting device.

* * * * *